United States Patent [19]
Togai et al.

[11] Patent Number: 5,305,662
[45] Date of Patent: Apr. 26, 1994

[54] DRIVE BY WIRE CONTROL DEVICE FOR AN INTERNAL COMBUSTION ENGINE AND A CONTINUOUS VARIABLE TRANSMISSION USING ENGINE TORQUE CORRECTION MEANS BASED ON ACCELERATION TO DETERMINE A RATE-OF-CHANGE OF SPEED-RATIO CORRECTION MEANS

[75] Inventors: Kazuhide Togai, Takatsuki; Takashi Takatsuka, Kyoto; Makoto Shimada, Okazaki; Junji Kawai, Anjo; Kazuya Hayafune, Okazaki, all of Japan

[73] Assignee: Mitsubishi Jidosha Kogyo Kabushiki Kaisha, Tokyo, Japan

[21] Appl. No.: 974,812

[22] Filed: Nov. 16, 1992

Related U.S. Application Data

[63] Continuation of Ser. No. 871,118, Apr. 20, 1992, abandoned.

[30] Foreign Application Priority Data

Apr. 19, 1991 [JP] Japan .................................. 3-88603
Apr. 7, 1992 [JP] Japan .................................. 4-85740

[51] Int. Cl.$^5$ .............................................. B60K 41/12
[52] U.S. Cl. .................................... 74/866; 364/424.1
[58] Field of Search ........................ 74/866, 857, 861; 364/424.1

[56] References Cited

U.S. PATENT DOCUMENTS

| | | | |
|---|---|---|---|
| 4,458,560 | 7/1984 | Frank et al. | 74/857 |
| 4,515,040 | 5/1985 | Takeuchi et al. | 74/866 |
| 4,584,907 | 4/1986 | Niwa et al. | 74/866 |
| 4,589,302 | 5/1986 | Oda et al. | 74/866 |
| 4,627,311 | 12/1986 | Yokooku et al. | 74/866 |
| 4,653,004 | 3/1987 | Osanai et al. | 74/866 X |
| 4,658,360 | 4/1987 | Osanai et al. | 364/424.1 |
| 4,747,325 | 5/1988 | Morimoto | 74/866 |
| 4,771,656 | 9/1988 | Itoh et al. | 74/866 |
| 4,893,526 | 1/1990 | Tokoro | 74/866 |
| 4,949,596 | 8/1990 | Iino et al. | 74/868 X |

FOREIGN PATENT DOCUMENTS

126880 12/1984 European Pat. Off.

Primary Examiner—Leslie A. Braun
Assistant Examiner—Khoi Ta

[57] ABSTRACT

A control device for an internal combustion engine and a continuous variable transmission which enables well-responsible transmission control to be carried out at a proper transmission rate without increasing the transmission shock. When engine power corresponding to an engine power torque corrected amount is changeable, then an intake air flow adjusting unit is controlled in response to a corrected engine power torque corrected amount. On the contrary, when the corrected engine power torque corrected amount is not changeable, the amount corrected engine power torque corrected is restricted within a range where the engine power can be changed.

9 Claims, 13 Drawing Sheets

DRIVE BY WIRE CONTROL DEVICE FOR AN INTERNAL COMBUSTION ENGINE AND A CONTINUOUS VARIABLE TRANSMISSION USING ENGINE TORQUE CORRECTION MEANS BASED ON ACCELERATION TO DETERMINE A RATE-OF-CHANGE OF SPEED-RATIO CORRECTION MEANS

This application is a continuation of application Ser. No. 07/871,118 filed on Apr. 20, 1992, now abandoned.

BACKGROUND OF THE INVENTION

This invention relates to a control device for use in an internal combustion engine and a continuous variable transmission, wherein the control device is connected to the continuous variable transmission arranged in a power transmission method between driving wheels and the internal combustion engine loaded on a vehicle. More particularly, this invention relates to a control device of this type in which power of an internal combustion engine can be adjusted by means of controlling an intake air flow adjusting unit and which gear ratio of the continuous variable transmission can be changed at a variable speed suitable for driving conditions of a vehicle.

Generally, engine power (hereinafter referred as power) of an internal combustion engine (hereinafter referred as an engine) mounted on a vehicle is mechanically controlled by a throttle device. The throttle device is coupled to an accelerator pedal and a throttle lever (both of which are referred as accelerator hereinafter) through an accelerator cable.

However, when the accelerator and the throttle device directly cooperate with each other, excessive power may be generated due to careless driving and lack of skill of a driver. The excessive power will cause many troubles: a car may slide when a driver steps the accelerator; slip on the icy ground; skid at a sudden acceleration.

With respect to the above-mentioned problems, many method have been proposed for the control device, such as a dual throttle valve method and a traction control (power control) method utilizing so called drive-by-wire method. In the dual throttle valve method, a main throttle valve and a sub throttle valve are arranged in the throttle device and the sub throttle valve is electronically controlled. The drive-by-wire method is one such that the accelerator cable is not disposed between the accelerator and the throttle valve. An accelerator opening (throttle opening) is detected by using a sensor such as a potentiometer, while the throttle valve is operated by a stepping motor or the like.

With the traction control method, the internal combustion engine and the continuous variable transmission are generally controlled by using an engine control unit (ECU). The ECU calculates an optimum opening for the main throttle valve and the sub throttle valve in accordance with the data representative of the rotation speed of the front and rear driving wheels as well as a step amount for the accelerator pedal. In this way, a driving shaft torque of the wheels is controlled so as not to cause the undesirable skid or the like.

An information regarding to the required power of the engine is properly determined in accordance with the data representative of, for example, the accelerator opening. As mentioned above, the ECU calculates the required power of the engine when using the traction control method for controlling the internal combustion engine and the continuous variable transmission. The sub throttle valve and the main throttle valve are controlled so as to obtain the calculated required power. In this event, it is preferable that the calculation is carried out with respect to a real torque of the current condition. More specifically, an over-control and a bad responsibility of the control device can be prevented by calculating a deviation between a required torque and the real torque and by carrying out a real time control to eliminate the deviation.

The real torque of the engine can be detected under a bench test using a chassis dynamometer. However, it is difficult to mount such a chassis dynamometer on a vehicle due to its weight, size, and costs. In addition, power (energy) loss is inevitable when using the chassis dynamometer for detecting the real torque of the engine.

On the contrary, a power torque of an engine is transmitted to a driving shaft via a transmission in the power transmission method for the engine. For example, a continuous variable transmission (CVT) is applied to a vehicle as such a transmission. The CVT can adjust a gear ratio in response to a signal indicative of hydraulic pressure which is applied to a hydraulic actuator.

In the continuous variable transmission of the type described, a gear speed is calculated so as to eliminate a gear ratio deviation between a desired gear ratio, calculated in accordance with a driving condition, and a real gear ratio. Accordingly, the hydraulic actuator Of the CVT can be controlled in order to obtain an optimum variable speed.

The above-mentioned conventional continuous variable transmission for a vehicle controls the hydraulic actuator so as to correct the real gear ratio into the desired gear ratio. However, a high/low level of the torque transmitted on control in not considered.

Accordingly, when the gear ratio of the CVT increases or decreases at a relatively low speed, the torque on the driving shaft is smoothly changed. Further, when the gear ratio deviation between the desired gear speed and the real gear speed is relatively large, the gear speed rapidly increases or decreases. However, the CVT consumes a gear operation torque and a moment of inertia of pulleys is relatively high. This may cause an opposed reaction against the gear acceleration with rough gear operation. In addition, excessive torque of the engine may result in slide of a steel belt. Such a "shock" on transmission is reduced merely by restricting the transmission rate, which results in low transmission performance of the continuous variable transmission.

SUMMARY OF THE INVENTION

It is therefore an object of this invention to provide a control device for an internal combustion engine and a continuous variable transmission, which enables to carry out well-responsible transmission control at a proper transmission rate without increasing the transmission shock.

Other objects of this invention will become clear as the description proceeds.

On describing the first aspect of this invention, in a control device for an internal combustion engine and a continuous variable transmission, the internal combustion engine is mounted on a vehicle and the continuous variable transmission is disposed between the internal combustion engine and driving wheels and a gear ratio of the continuous variable transmission can be continuously changable, wherein the control device comprises a intake air flow adjusting means disposed in an inlet of the internal combustion engine, the intake air flow adjusting means can be controlled without depending on operation of a driver-operable member; operational amount detecting means for detecting operational amount of the driver-operable member to produce an operational amount signal; desired gear ratio determining means for determining a desired gear ratio for the continuous variable transmission in response to the operational amount signal to produce a desired gear ratio signal; gear ratio detecting means for detecting a real gear ratio of the continuous variable transmission to produce a real gear ratio signal; gear ratio deviation calculating means for calculating a deviation between the desired gear ratio determined by the desired gear ratio determining means and the real gear ratio detected by the gear ratio detecting means to produce a gear ratio deviation signal; gear speed determining means for determining a gear speed in response to the gear speed deviation signal to produce a gear speed signal, wherein the gear speed being directly proportional to the gear ratio; driving condition judging means for judging a driving condition of a vehicle in response to a real car speed signal to produce a driving condition signal, wherein the driving condition comprises at least a real acceleration condition of the vehicle; desired acceleration determining means for determining a desired car acceleration in response to the driving condition signal to produce a desired acceleration signal; acceleration deviation calculating means for calculating an acceleration deviation between the desired car acceleration determined by the desired acceleration determining means and the real car acceleration detected by the driving condition detecting means to produce an acceleration deviation signal; engine power torque corrected amount determining means for determining an engine power torque corrected amount in response to the real gear ratio signal and the acceleration deviation signal to produce an engine power torque corrected amount signal, wherein the engine power torque corrected amount being required for eliminating the acceleration deviation calculated by the acceleration deviation calculating means; engine torque controlling means for controlling the intake air flow adjusting means, by using the engine power torque corrected amount signal, when an engine power which is equal to the engine power torque corrected amount determined by the engine power torque corrected amount determining means is changable, to produce an engine torque signal, and using a restricted engine power torque corrected amount signal, when the engine power is not changable to produce a deficient torque signal, wherein the restricted engine power torque corrected amount signal being obtained by restricting the engine power torque corrected amount signal within a range where the engine power being changable; gear speed correcting means for correcting the gear speed determined by the gear speed determining means in response to the deficient torque signal to produce a corrected gear speed signal; and gear controlling means for controlling the continuous variable transmission so as to operate the continuous variable transmission at the gear speed obtained by the gear speed correcting means.

In a second aspect of this invention, a control device according to the first aspect of this invention further comprises a required torque determining means for determining a required torque representing a torque of the internal combustion engine required by a driver of the vehicle in response to the operational amount signal detected by the operational amount detecting means; the engine torque controlling means comprises desired engine torque determining means for determining a desired engine torque for the internal combustion engine in response to the desired torque signal supplied from the desired torque determining means and to the engine power torque corrected amount signal supplied from the engine power torque corrected amount determining means to produce a desired engine torque signal, restricting means for restricting the desired engine torque signal supplied from the desired engine torque determining means within a range of an allowable engine torque, and intake air flow controlling means for controlling the intake air flow adjusting means in response to the desired engine torque signal being restricted within the predetermined range.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
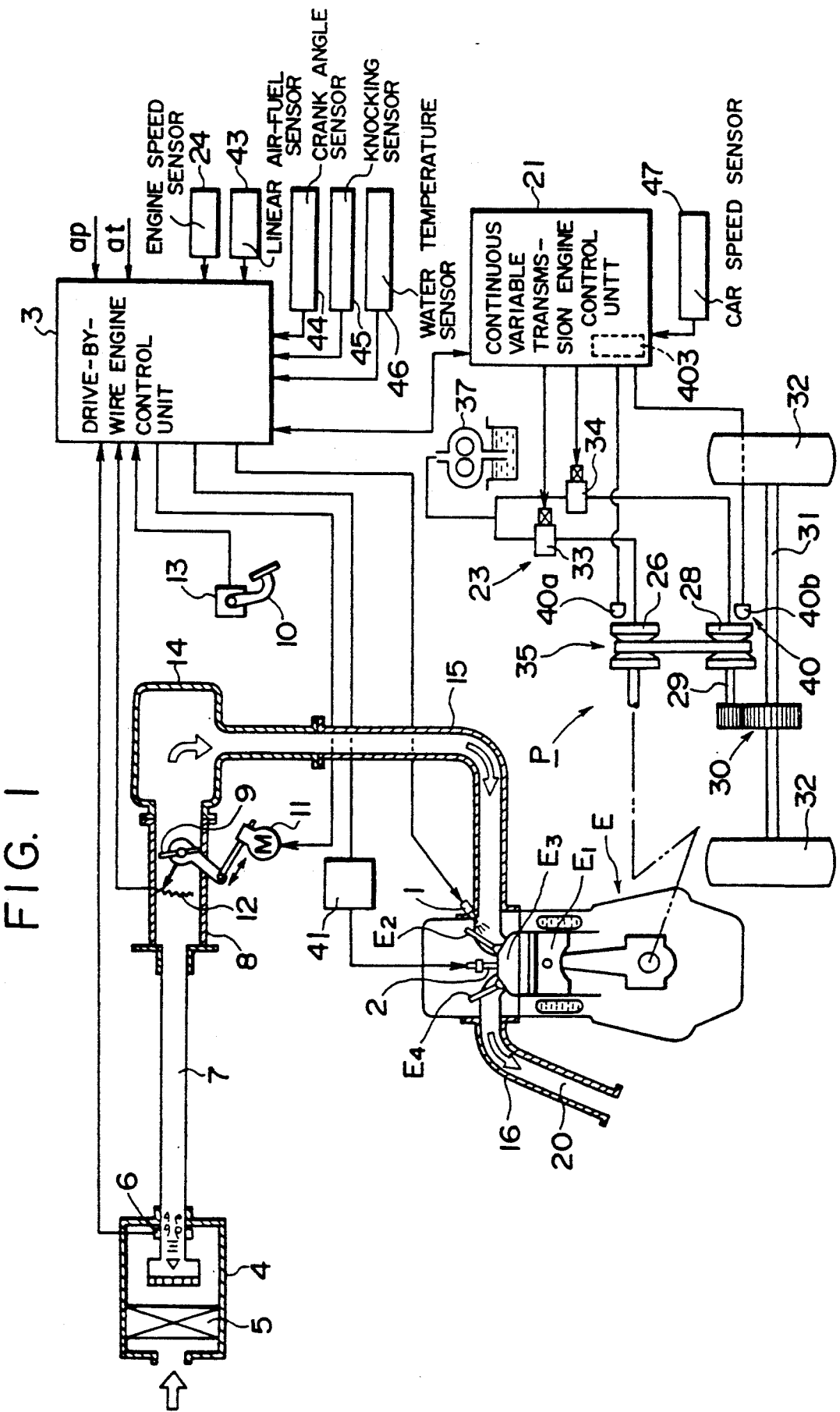
FIG. 1 is a structural schematic diagram of a control device for an internal combustion engine according to an embodiment of this invention.

FIG. 1 shows a schematic view of a gasoline engine system (hereinafter referred simply as an engine system) and a power transmission method P, utilizing a control device according to an embodiment of the present invention for an internal combustion engine and a continuous variable transmission.

Figure 16:
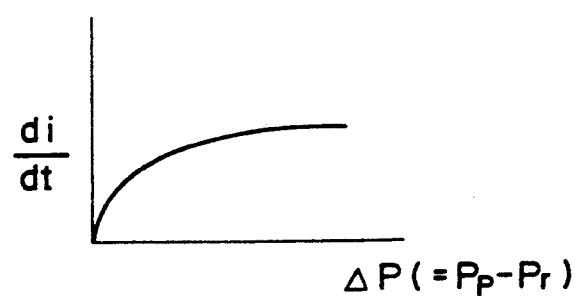
FIG. 16 shows a gear speed calculating map for the CVT.

Referring to FIG. 1, the engine system includes an electronically controlled injection (ECI) four-cycle engine E as the internal combustion engine. In this system, some devices such as an injector 1 and a spark plug 2 are controlled by a drive-by-wire engine control unit (DBWECU) 3. As is known in the art, the injector 1 is a device by which liquid fuel is converted to vapour and sprayed into cylinders of the internal combustion engine and the spark plug 2 is a device for igniting air-fuel mixture in the internal combustion engine by an electric spark (not shown). The DBWECU 3 is connected to a continuous variable transmission engine control unit (CVTECU) 21. The DBWECU 3 communicates, through a communication line, with the CVTECU 21 which electronically controls a continuous variable transmission (CVT) 35 in the power transmission method P. As will later be described more detail, each of the DBWECU 3 and the CVTECU 21, which both serve as an electronic control arrangement for the engine system, includes a microcomputer (not shown). Each of the microcomputers includes a memory circuit (not shown) for memorizing a main routine for the DBWECU 3 (FIG. 5), an engine power control processing routine (FIG. 6), a CVT control processing routine (FIG. 7), a gear-ratio-corresponding engine speed calculating map (illustrated in FIG. 8), an intake air flow/torque calculating map (FIG. 9), a throttle opening/intake air flow calculating map (FIG. 10), a torque/engine speed calculating map (FIG. 11), a gear speed/gear ratio deviation calculating map (FIG. 12), a dowel angle calculating map (FIG. 13), and a gear speed/controlled hydraulic pressure calculating map (FIG. 16). The memory circuit (RAM) includes predetermined areas for data storage.

The DBWECU 3 is connected to an actuator 11 for actuating a throttle valve 9 which serves as an intake air flow adjusting unit for adjusting a flow of an intake air supplied to the engine system. In other words, an operation of the throttle valve 9 is not directly affected by that of an accelerator 10, namely, driver-operable member. The throttle valve 9 may be a butterfly valve. The accelerator 10 is coupled to an accelerator opening sensor 13 which serves as an operational amount detecting unit. The accelerator opening sensor 13 may be, for example, a potentiometer for detecting an accelerator opening Oa to produce an electric signal indicative of the detected accelerator opening Oa and supplied to the DBWECU 3 as an acceleration requirement signal. The DBWECU 3 then modifies the acceleration requirement signal into a valve control signal which is supplied to the actuator 11. The actuator 11 actuates the throttle valve 9 in response to the valve control signal.

The DBWECU 3 is also connected to an engine speed sensor 24, a linear air-fuel sensor 43, a crank angle sensor 44, a knocking sensor 45, and a water temperature sensor 46. The operation and function of these sensors are clarified as the description proceeds.

Description will be made as regards to an entire construction of the engine system mainly along a direction to which the air flows in the engine system.

An air cleaner body 4 includes an air cleaner element 5 and an air flow sensor 6 which acts as an intake air flow detecting arrangement for detecting a flow of an intake air which is supplied to the air cleaner body 4 passing through the air cleaner element 5. In this embodiment, the Karman vortex air flow sensor is used for the air flow sensor 6. However, it is obvious that other like devices can be applicable to the air flow sensor 6. The air cleaner body 4 includes other sensing devices for sensing physical amounts of the intake air, such as an atmospheric pressure sensor and an atmospheric temperature sensor. As is known in the art, the physical amounts of the intake air are measured by using these sensing devices, including the air flow sensor 6, which produce sensed data representative of these physical amounts. The sensed data is supplied to the DBWECU 3. The intake air is delivered through an inlet pipe 7 to a throttle body 8.

The intake air in the throttle body 8 then flows into a surge tank 14 through the throttle valve 9 for controlling the air flow supplied to the surge tank. As mentioned above, the opening/closing operation of the throttle valve 9 is carried out without being directly affected by the operation of the accelerator 10 stepped by a driver. In this embodiment, a stepping motor is used for the actuator 11 but it is obvious that any one of like devices can be applicable as the actuator 11. The actuator 11 is controlled by the DBWECU 3 which adopts the conventional drive-by-wire (DBW) method. When the throttle valve 9 is actuated by the actuator 11, a throttle position sensor (hereinafter referred as a throttle sensor) 12 detects a current position of the throttle valve 9. The throttle sensor 12 supplies an intake air flow signal, to the DBWECU 3, indicative of the air flow passing through the throttle valve 9.

The intake air flowing into the throttle body 8 is delivered through the surge tank 14 to an intake manifold 15. At the downstream of the intake manifold 15, the injector 1 injects the fuel into the air in response to an ignition control signal supplied from the DBWECU 3. The resulting air-fuel mixture is poured into a combustion chamber $E_3$ by opening a suction valve $E_2$ disposed in the engine E. The air-fuel mixture is then ignited by using the spark plug 2 at or around a top dead center (TDC). The TDC represents an instant when a compression stroke is or a subsequent expansion stroke is started. After completion of the explosion/expansion stroke, the air-fuel mixture is supplied into an exhaust manifold 16 as exhaust gas by opening an exhaust valve $E_4$. An exhaust path 20 is formed in the exhaust manifold 16 and the exhaust gas is sent through the exhaust path 20 to an exhaust gas clarification system (not shown). The exhaust gas clarification system removes hazardous components such as the carbon monoxide (CO) and the hydrocarbon (HC) from the exhaust gas. The clarified gas is then exhausted through a muffler (not shown) to the outside of the engine system.

Figure 2:
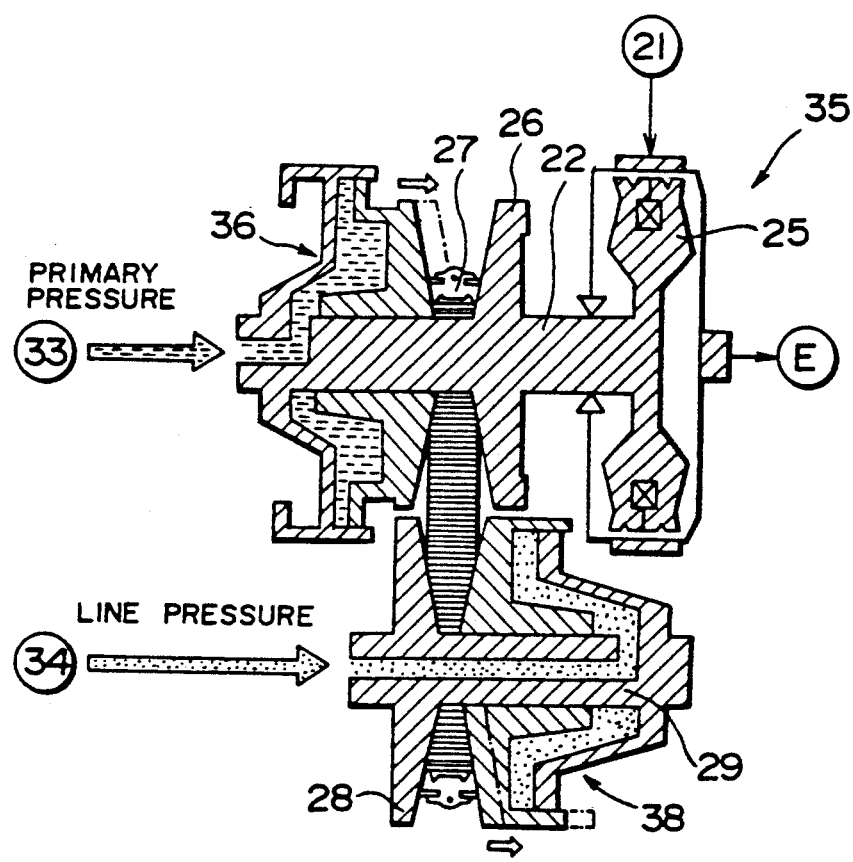
FIG. 2 is a sectional view of a continuous variable transmission applied to the device as illustrated in FIG. 1.

Referring now to FIG. 2 in addition to FIG. 1, description will proceed as regards to the power transmission system P connected to the engine E. A hydraulic actuator 23 is coupled to the CVTECU 21 in order to control the continuous variable transmission 35 by hydraulic energy. A crankshaft (not shown) of the engine E is operatively coupled to an electromagnetic clutch 25 of the continuous variable transmission 35 illustrated in FIG. 2. An output of the electromagnetic clutch is coupled to a primary shaft 22. The primary shaft 22 is united with a primary pulley 26. Similarly, a secondary pulley 28 is united with a secondary shaft 29. Each of the first and the second pulleys consists of a pair of discs having inclined inner surfaces. The primary pulley 26 and the secondary pulley 28 are linked together by using a steel belt 27. The secondary shaft 29 is constructed such that the turning effort of the secondary pulley is transmitted to driving wheels 32 which are coupled to a driving shaft 31 via a reduction gear train 30 and a differential gear (not shown).

One of the primary pulley discs serves as a part of a piston unit of a hydraulic actuator 36. The hydraulic actuator 36 is coupled to a first electromagnetic valve 33 and in turn to a hydraulic source 37. The hydraulic source 37 is used for applying primary pressure to the hydraulic actuator 36. Similarly, one of the secondary pulley discs serves as a part of a piston unit of a hydraulic actuator 38. The hydraulic actuator 38 is coupled to a second electromagnetic valve 34 and in turn to the hydraulic source 37. The hydraulic source 37 is also used for applying line pressure to the hydraulic actuator 38. The first and the second electromagnetic valves 33 and 34 are controlled in response to an output signal (duty signal) supplied from the CVTECU 21.

Therefore, the effective diameter of each pulley can be relatively changed according to the opening/closing ratio (duty ratio) of the first and the second electromagnetic valves 33 and 34, respectively. More specifically, the primary pulley 26 is opened and the secondary pulley 28 is closed when the rotation speed of the engine is relatively low. In other words, the primary pulley 26 has a small effective diameter while the secondary pulley 28 has a large one. When the engine rotates at a relatively high speed, the relatively lower line pressure is applied to the secondary pulley 28. Under such circumstances, the secondary pulley 28 is opened and the effective diameter thereof becomes relatively small. In this manner, the continuous variable transmission can be achieved by means of changing engagement of the steel belt to the pulleys.

It is noted that a sensor unit 40 is disposed for detecting rotation speeds of the pulleys. The sensor unit 40 includes a pair of sensors 40a and 40b which detect rotation speeds wcf and wcr of the primary pulley 26 and the secondary pulley 28, respectively. The sensors 40a and 40b are connected to a divider 48 disposed in the CVTECU 21. The divider is used for obtaining a real gear ratio in. In addition, the CVTECU 21 is connected to a car speed sensor 47. Supplied with the rotation speed wcr of the secondary pulley 28, the car speed sensor 47 multiples wcr by a constant $\alpha$ to produce a car speed signal Vn, where $\alpha$ is equivalent to a predetermined gear ratio.

Figure 3:
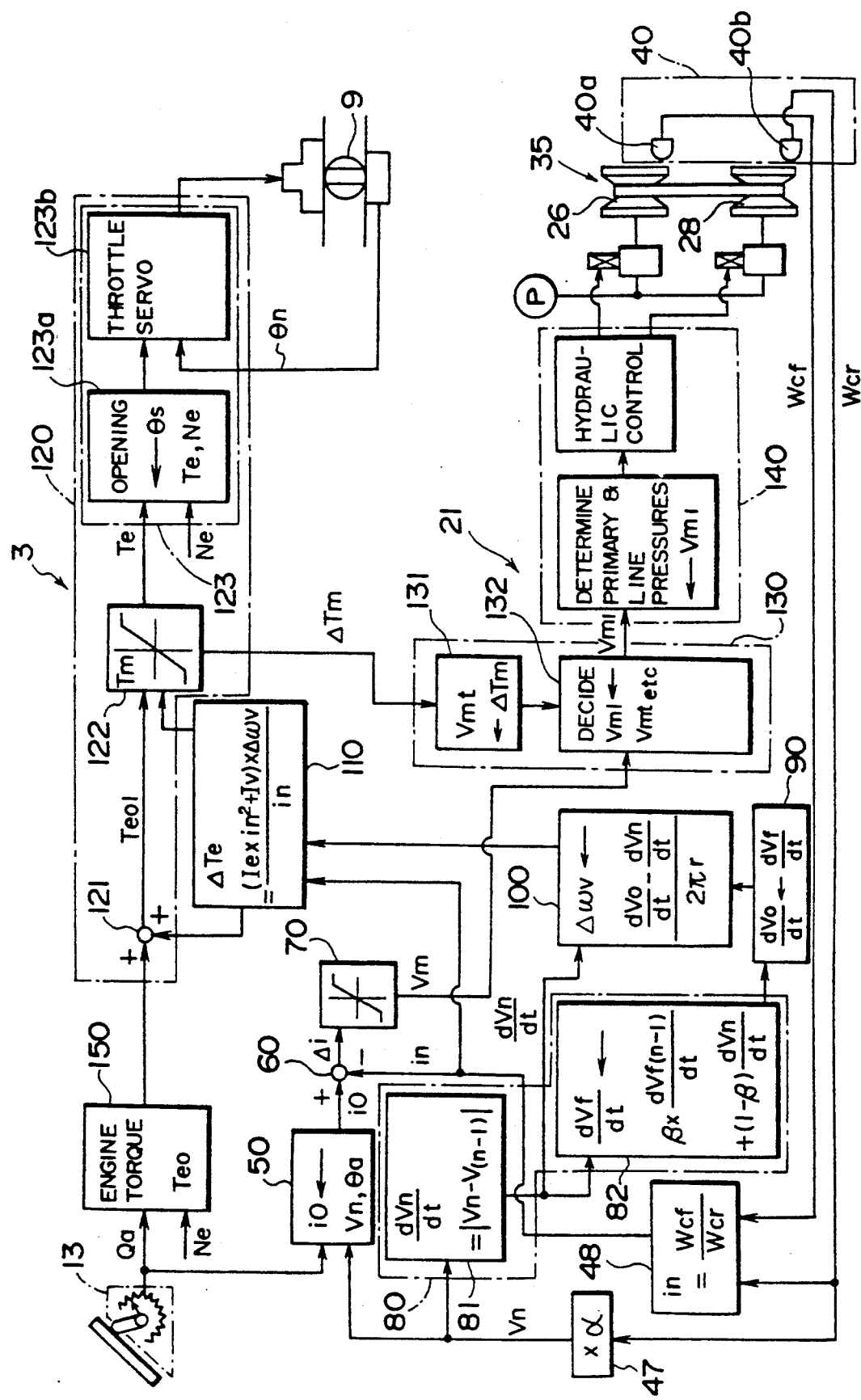
FIG. 3 is a functional block diagram for use in describing operation and function of electronic control unit in the device illustrated in FIG. 1.

Referring to FIG. 3, illustrated is a functional block diagram of a drive-by-wire engine control unit (DBWECU) 3 and a continuous variable transmission (CVTECU) 21. It is noted that the description regarding operation of the DBWECU 3 and the CVTECU 21 will later be made in more detail in conjunction with flow charts illustrated in FIGS. 5 through 7. However, to facilitate the understanding of the operation of these engine control units, description will be made with reference to FIG. 3.

As shown in FIG. 3, the control device according to an embodiment of this invention includes a throttle valve 9 which acts as an intake air flow adjusting unit, an accelerator opening sensor 13 which acts as an operational amount detecting unit, a car speed sensor 47, a gear ratio sensor 48 which serves as a gear ratio detecting unit, a desired gear ratio determining unit 50, a gear ratio deviation calculating unit 60, a gear speed determining unit 70, a driving condition judging arrangement 80, a desired acceleration determining unit 90, an acceleration rate deviation calculating unit 100, an engine power torque corrected amount determining unit 110, an engine torque controlling arrangement 120, a gear speed correcting arrangement 130, and a transmission controlling arrangement 140.

As described above, the sensor 40a and 40b detect a rotation speed of the pulleys 26 and 28, namely, wcf and wcr, respectively. It is noted here that each of the detected values is produced, in reality, as a signal representing thereof. However, the word "signal" is omitted hereinafter for the purpose of brevity of description. Thus, an expression, for example, that the rotation speed wcf is produced means that the signal indicative of the rotation speed wcf is produced. Any other detected values or calculated values are also described like this.

The rotation speeds wcf and wcr are supplied to the gear ratio detecting arrangement 48 to produce a real gear ratio in of the continuous variable transmission 35. The real gear ratio in is then supplied to the gear ratio deviation calculating arrangement 60. The rotation speed wcr is also supplied to a car speed sensor 47 where a constant $\alpha$ is multiplied to the rotation speed wcr to produce a car speed Vn. The car speed Vn is delivered to the desired gear ratio determining unit 50.

The operational amount detecting unit (accelerator opening sensor) 13 detects an operational amount $\theta a$ of the accelerator pedal 10 to supply it to the desired gear ratio determining unit 50. Supplied with the operational amount $\theta a$ and the car speed Vn, the desired gear ratio determining unit 50 determines a desired gear ratio io for the continuous variable transmission 35. The desired gear ratio io is supplied to the gear ratio deviation calculating unit 60. The gear ratio deviation calculating unit 60 calculates a gear ratio deviation $\Delta i$ by subtracting the real gear ratio in from the desired gear ratio io, namely:

$$\Delta i = io - in. \qquad (1)$$

Figure 12:
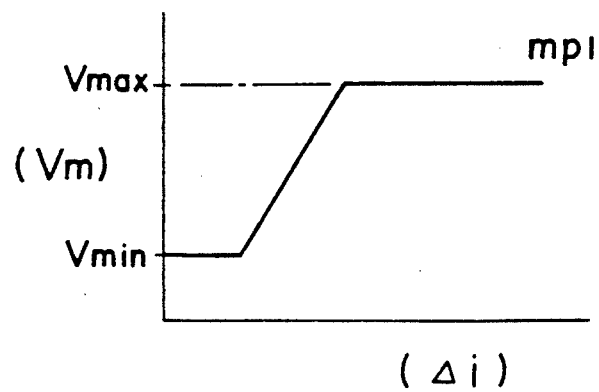
FIG. 12 shows a gear speed calculating map for use in power control carried out by the device as illustrated in FIG. 1.

The gear ratio deviation $\Delta i$ is supplied to the gear speed determining unit 70. The gear speed determining unit 70 determines a gear speed Vm according to the gear ratio deviation $\Delta i$ by using a map as illustrated in FIG. 12. It is noted that the gear speed Vm is directly proportional to the deviation gear ratio $\Delta i$.

The driving condition judging arrangement 80 includes a car acceleration calculating unit 81 and a smoothed acceleration calculating unit 82. As will later be described in more detail, the car acceleration calculating unit 81 calculates a car acceleration dVn/dt in response to the car speed Vn. The calculated car acceleration dVn/dt is then supplied to the smoothed acceleration calculating unit 82 to produce a smoothed acceleration dVf/dt. The smoothed acceleration calculating unit 82 is connected to the desired acceleration determining unit 90. Supplied with the smoothed acceleration dvf/dt, the desired acceleration determining unit 90 determines a desired car acceleration dvo/dt. The desired car acceleration deviation dVo/dt is delivered to the acceleration deviation calculating unit 100 where an acceleration deviation Δwv is determined in response to the desired car acceleration dvo/dt and the smoothed acceleration dVn/dt in a manner described hereinafter.

Supplied with the acceleration deviation Δwv and the real gear ratio in, the engine power torque corrected amount determining unit 110 determines an engine power torque corrected amount ΔTe. The engine power torque corrected amount ΔTe, which is required to eliminate the acceleration deviation Δwv, is then delivered to the engine power torque controlling arrangement 120. The engine torque controlling arrangement 120 includes a desired engine torque determining unit 121, a restricting arrangement 122, and an intake air flow controlling arrangement 123. The intake air flow controlling arrangement 123 includes an acceleration opening calculating unit 123a and a throttle servo 123b.

Figure 11:
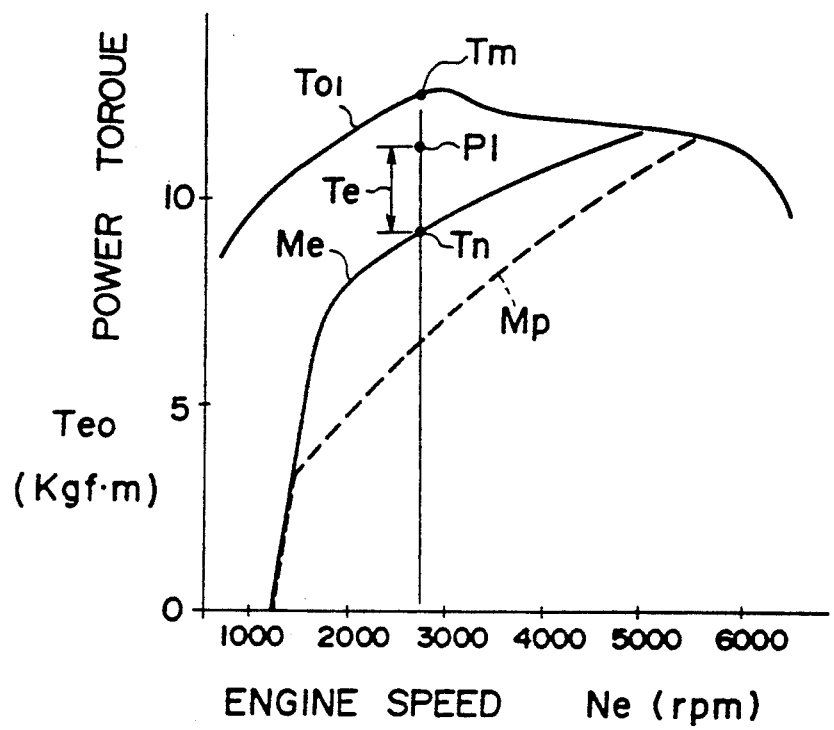
FIG. 11 shows a torque calculating map for use in power control carried out by the device as illustrated in FIG. 1.

The desired engine torque determining unit 121 determines a desired engine torque Teo1 in response to a required torque Teo and to the engine power torque corrected amount ΔTe. The required torque Teo is calculated in a manner described below at a required torque determining unit 150. The restricting arrangement 122 restricts the desired engine torque Teo1 within a predetermined range of an allowable engine torque by using a torque calculating map as illustrated in FIG. 11. The restricted desired engine torque Teo1 is used for producing both the desired engine torque Te and a deficient torque ΔTm. The restricted desired engine torque Te is delivered to the intake air flow controlling arrangement 123 and the deficient torque ΔTm is delivered to the gear speed correcting arrangement 130. Detailed description regarding the operation carried out at the restricting arrangement 122 will be made below with reference to FIG. 4. The intake air flow controlling arrangement 123 controls the intake air flow adjusting unit (the throttle valve) 9 in response to the restricted desired engine torque Te and the engine speed Ne in a manner described below.

The gear speed correcting arrangement 130 corrects the gear speed Vm in accordance with a deficient torque ΔTm and produces a corrected gear speed Vm1. More specifically, the gear speed correcting arrangement 130 includes a gear speed deficiency calculating unit 131 and a gear speed deciding unit 132. The gear speed deficiency calculating unit 131 calculates a gear speed deficiency Vmt corresponding to the deficient torque Tm and the real gear speed in. The gear speed deciding unit 132 decides a corrected gear speed Vm1.

The gear speed Vm1 is supplied to the gear change controlling unit 140 to control the gear speed at the calculated gear speed Vm1.

Figure 4:
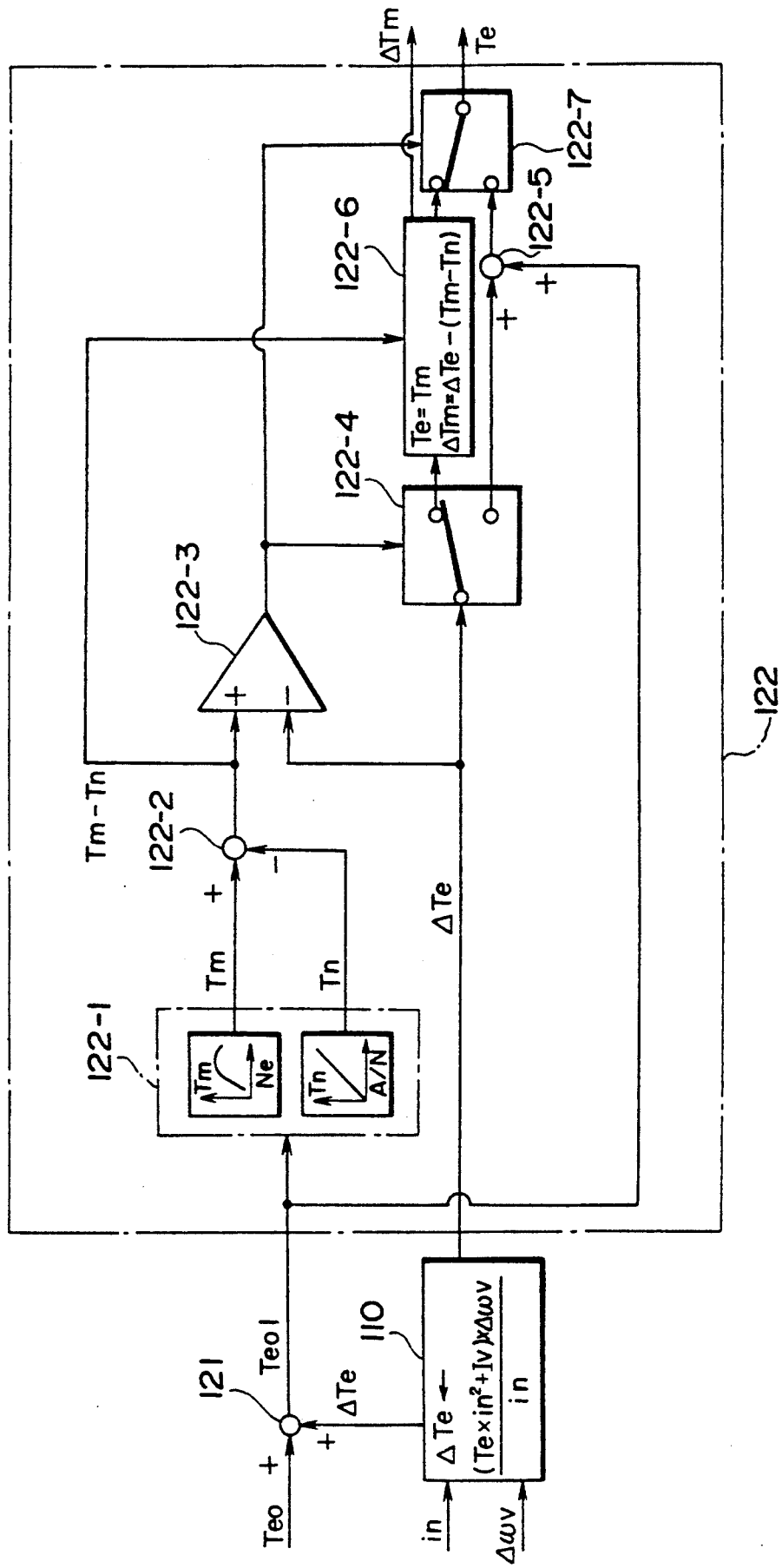
FIG. 4 is a functional block diagram for use in describing operation and function of a restricting arrangement illustrated in FIG. 3.
Figure 9:
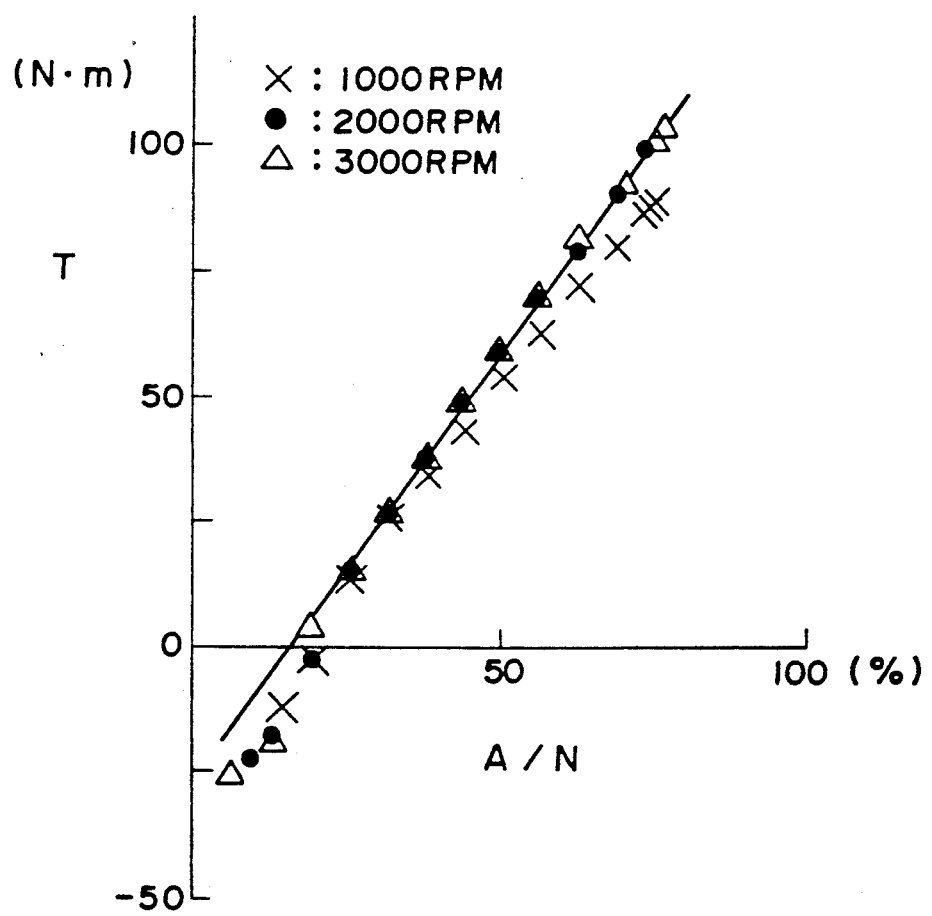
FIG. 9 shows an intake air flow/torque calculating map for use in power control carried out by the device as illustrated in FIG. 1.

Referring to FIG. 4, description will proceed for further understanding as regards to the operation and function of the restricting arrangement 122. The restricting arrangement 122 includes a maximum spare torque/real engine torque calculating unit 122-1, a subtracting unit 122-2, a comparison unit 122-3, a first switching unit 122-4, an adding unit 122-5, a desired engine torque substituting unit 122-6 and a second switching unit 122-7. The maximum spare torque/real engine torque calculating unit 122-1 calculates a maximum spare torque Tm for the current engine speed Ne by using the torque calculating map as illustrated in FIG. 11. In addition, the maximum spare torque/real engine torque calculating unit 122-1 also calculates a real engine torque Tn corresponding to the detected engine speed Ne and the intake air flow A/N by using the intake air flow/torque calculating map as illustrated in FIG. 9.

The calculated Tm and Tn are supplied to the subtracting unit 122-2 for subtracting the real engine torque Tn from the maximum spare torque Tm to produce a subtracted result (Tm− Tn). This result is then supplied to the comparison unit 122-3. Another input for the comparison unit 122-3 is connected to the engine power torque corrected amount determining unit 110. The comparison unit 122-3 compares the engine power torque corrected amount ΔTe with the subtracted result (Tm−Tn). The engine power torque corrected amount ΔTe is also supplied to the first switching unit 122-4.

The first switching unit 122-4 is used for selectively delivering the engine power torque corrected amount ΔTe either to the adding unit 122-5 or to the desired engine torque substituting unit 122-6. More specifically, a corrected desired engine torque Te is determined by adding the engine output torque corrected value ΔTe to the desired engine torque Teo1 when the engine power torque corrected amount ΔTe is smaller than the subtracted result (Tm−Tn). On the contrary, when the engine power torque corrected amount Te is larger than the subtracted result (Tm−Tn) the engine power torque corrected amount ΔTe is supplied to the desired engine torque substituting unit 122-6 through the first switching unit 122-4, where a value of a maximum torque Temax, that is, the maximum spare torque Tm corresponding to the current engine speed Ne is used as the desired engine torque Te. The second switching unit 122-7 is used for producing the desired engine torque Te selectively supplied from one of the adding unit 122-5 and the desired engine torque substituting unit 122-6 in response to the comparison result obtained at the comparison unit 122-3. In addition, the deficient torque ΔTm is calculated by subtracting (Tm−Tn) from the engine power torque corrected amount ΔTe.

Figure 5:
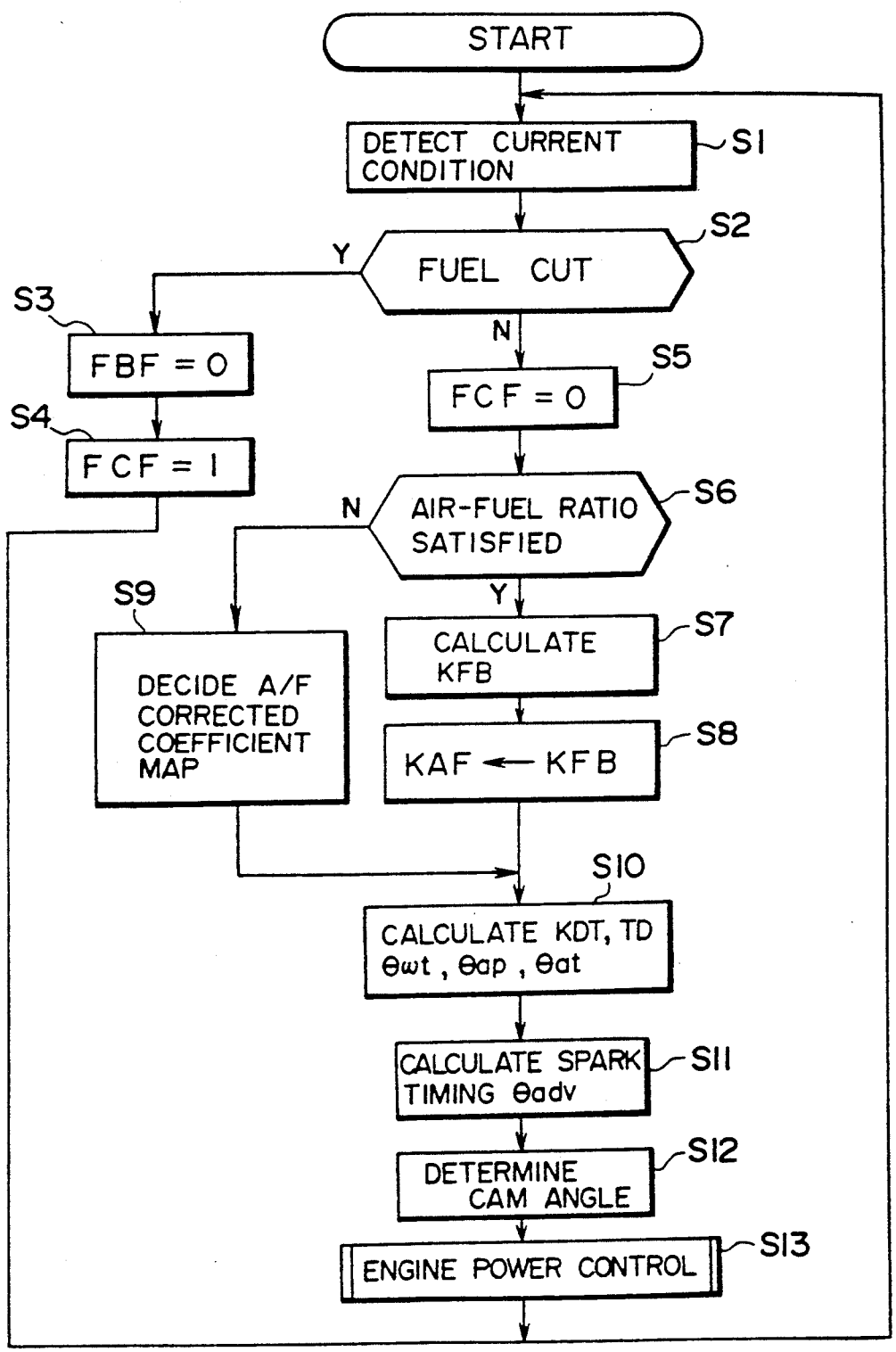
FIG. 5 is a flow chart of a main routine carried out by the device as illustrated in FIG. 1.
Figure 6:
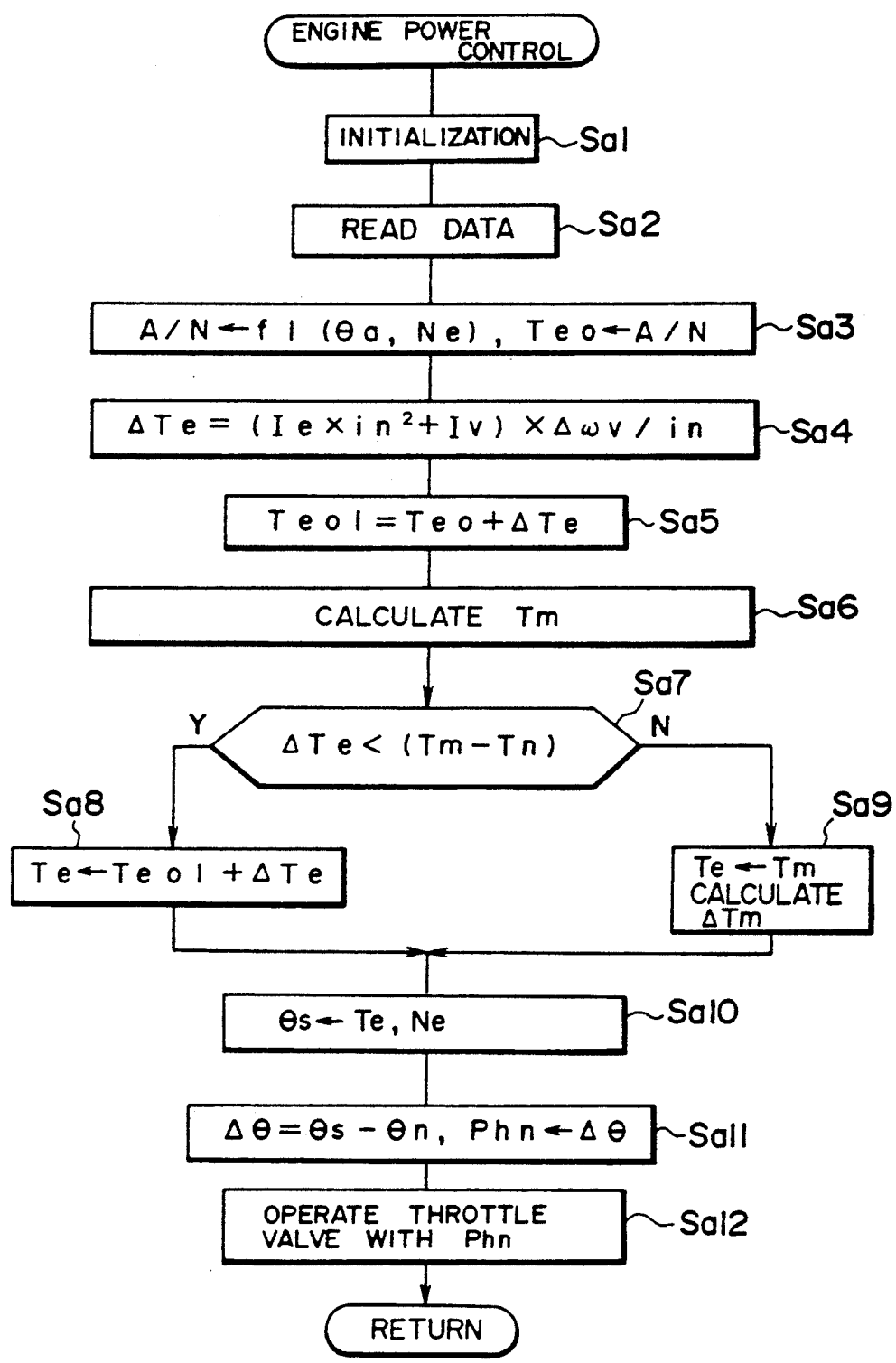
FIG. 6 a flow chart of a sub routine for an engine power control carried out by the device as illustrated in FIG. 1.
Figure 7:
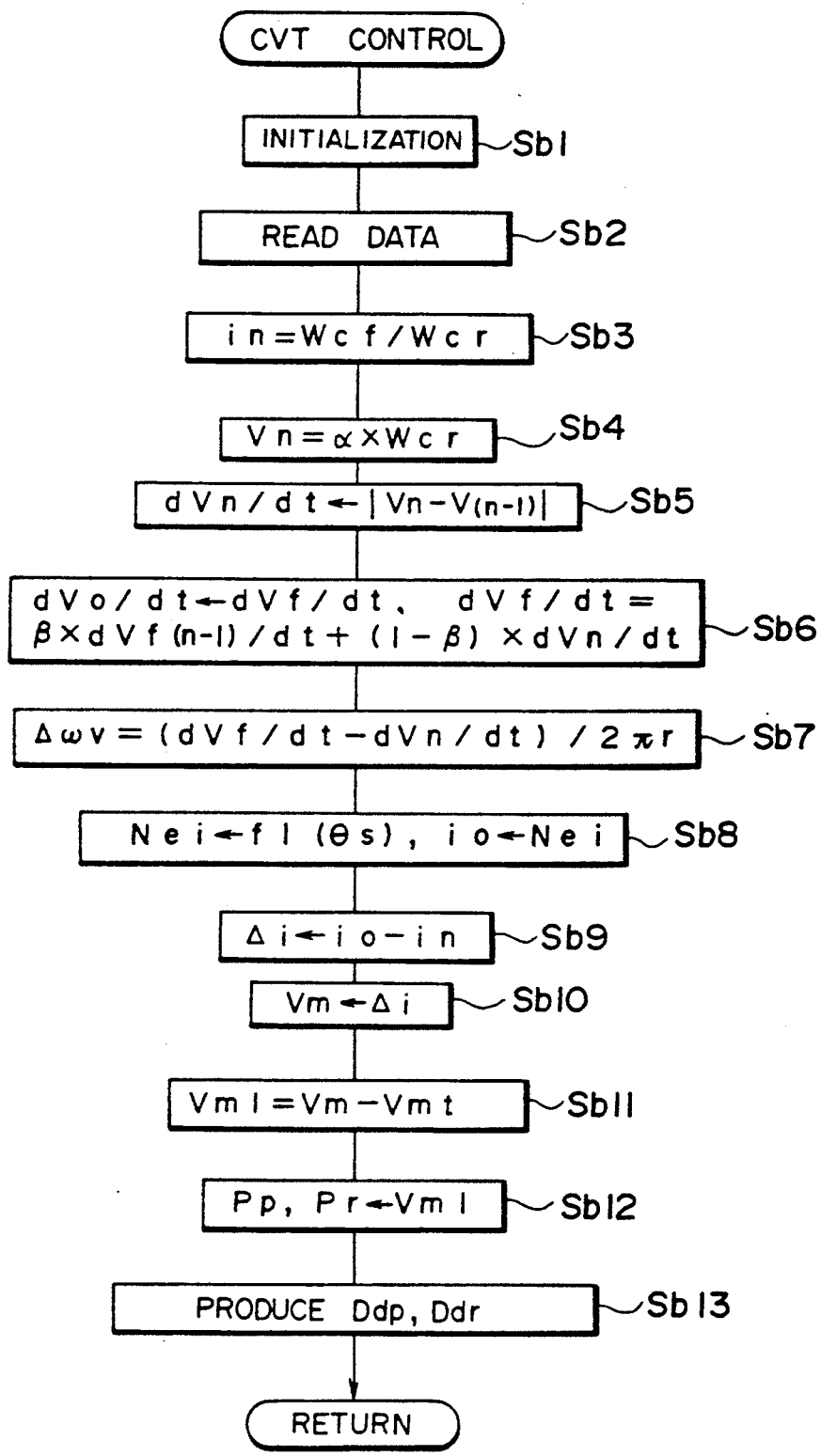
FIG. 7 is a flow chart of a sub routine for a CVT control carried out by the device as illustrated in FIG. 1.

Referring to FIGS. 5 through 7, description will be made as regards to the operation of the control device according to an embodiment of the present invention. It is noted that the DBWECU 3 and the CVTECU 21 are carried out in operation when the engine system E is driven by operating an ignition key (not shown).

First, the DBWECU 3 carries out a main routine as illustrated in FIG. 5. At the beginning of the main routine, the DBWECU 3 carries out initialization operation. At step S1, current conditions of the engine E and the power transmission method P are detected by using the sensed data indicative of, for example, the throttle valve opening θa and the intake air flow A/N, supplied from each sensor connected thereto. The detected data are then stored in a predetermined memory area in the memory circuit. At step S2, the DBWECU 3 determines whether or not fuel cut is mainly carried out in the engine. This determination is made in accordance with an engine speed Ne and an engine load (using the intake air flow A/N in this embodiment). As well known in the art, the fuel cut is carried out when the accelerator pedal is not stepped, that is, when the accelerator opening θa is equal in number to zero while the engine speed is not equal in number to zero. When the step S2 is positive, it is followed by step S3. At step S3, a feedback flag FBF is reset. Subsequently, a fuel cut flag FCF is set at step S4. The feedback flag FBF and the fuel cut flag FCF are disposed in the memory circuit (not shown) in the DBWECU 3. After carrying out the step S4, the process returns back to the step S1.

When the step S2 is negative, this step proceeds to step S5 where the fuel cut flag FCF is reset. At step S6, the DBWECU 3 determine whether or not a well known air-fuel ratio feedback condition is satisfied. When the step S6 is negative due to, for example, a power driving state of the engine, an air-fuel (A/F) correction coefficient KMAP is calculated, at step S9, in accordance with some data (A/N,Ne) indicative of the current driving condition of a vehicle. The calculated KMAP is stored in the memory location addressed by an address KAF. The step S9 proceeds to step S10.

On the contrary, when the step S6 is positive, step S7 is carried out. At step S7, a corrected value KFB is calculated with respect to a sensed data supplied from the air-fuel sensor 43. The corrected value KFB, which is calculated by using a stoichiometric ratio, is indispensable to make an actual air-fuel ratio close to the stoichiometric ratio. As well known in the art, the stoichiometric ratio is used as a constant for a feedback control in general. The corrected value KFB is stored in an memory location addressed by an address KAF and then step S10 is proceeded.

At the step S10, a fuel injection pulse correction coefficient KDT and a dead time corrected value TD are set according to the current driving condition in a-manner well known in the art. In addition, a water temperature corrected value $\theta wt$, an atmospheric pressure corrected value $\theta ap$, and an intake air temperature corrected value $\theta at$ are calculated by using signals supplied from corresponding sensors.

At step S11, an ignition timing $\theta adv$ is calculated according to a following equation:

$$\theta adv = \theta b + \theta wt + \theta ap + \theta at - \theta ret \quad (2)$$

where $\theta b$ represents an ignition angle calculated by using a well known map with respect to a load and the engine speed Ne. $\theta ret$ is used for retarding the ignition timing when the occurrence of a knocking is detected by the knocking sensor 45. The water temperature corrected value $\theta wt$ is advanced depending on decrease of the water temperature. Similarly, the atmospheric pressure corrected value $\theta ap$ is advanced depending on decrease of the atmospheric pressure while the intake air temperature corrected value $\theta at$ is advanced depending on decrease of the intake air temperature. The calculated ignition timing $\theta adv$ is stored in a predetermined memory area.

Figure 13:
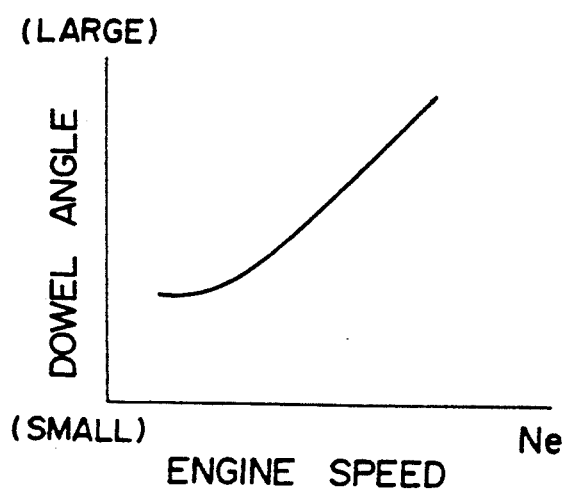
FIG. 13 shows a dowel angle calculating map for use in power control carried out by the device as illustrated in FIG. 1.

At step S12, a dowel angle (cam angle) is determined by using, for example, a map illustrated in FIG. 13 so as to make the dowel angle increase as the engine speed Ne increases. Accordingly, the step S12 is carried out in consideration with the engine speed Ne. The step S12 proceeds to step S13. At the step S13, the sub-routine illustrated in FIG. 6 is carried out for controlling the power of the engine. After completion of the engine power control routine, the sub-routine then returns to the step S1 of the main routine.

A fuel injection control routine (not shown) for controlling the injector 1 is carried out with a well known control process with respect to the corrected value KFB calculated by using a main routine. In addition, an ignition control routine (not shown) is carried out, in a manner well known in the art, for supplying a control signal to the ignition circuit 41 in order to make the spark plug 2 operate at the calculated spark timing $\theta adv$. These control routines are carried out by each predetermined crank angle detected by the crank angle sensor 44.

Figure 10:
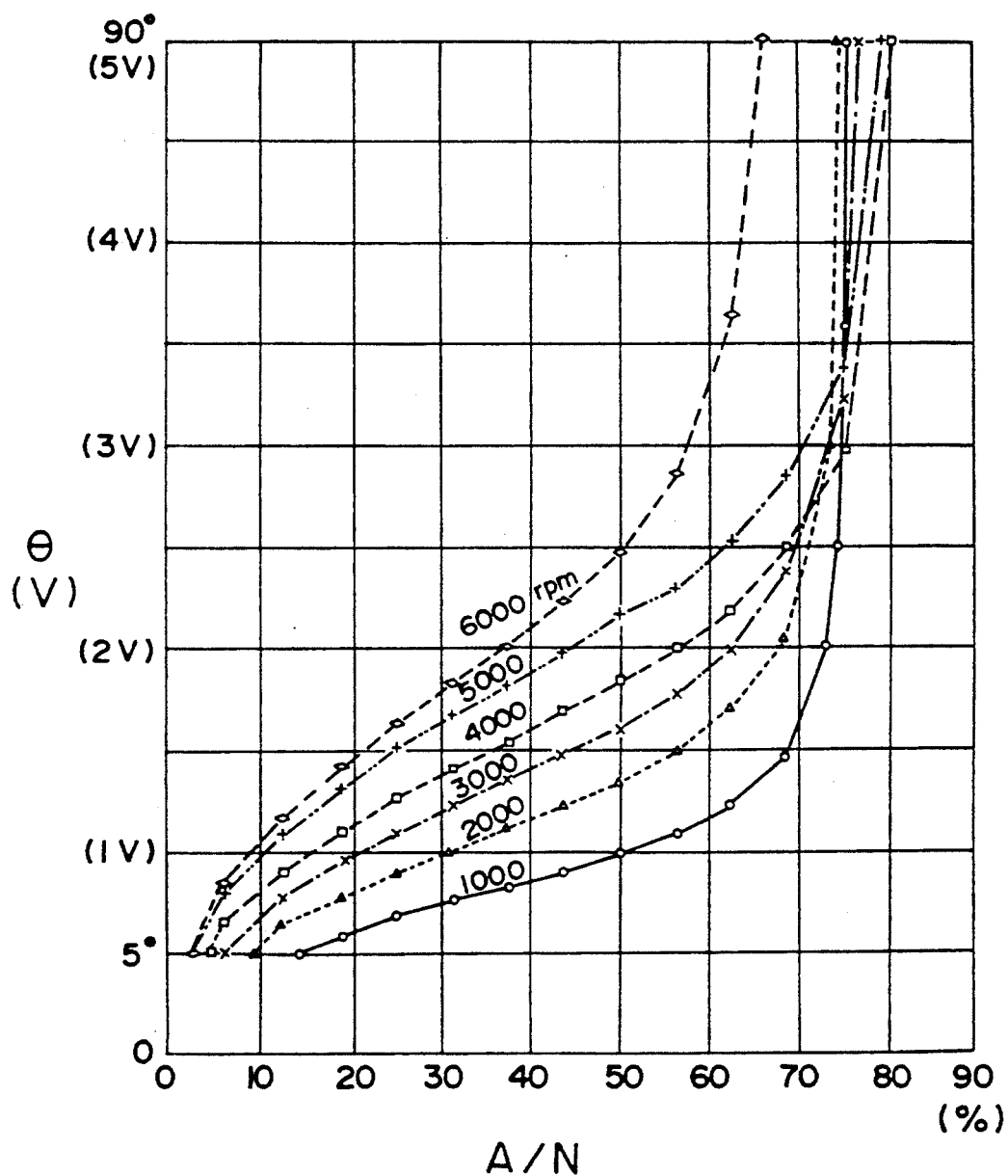
FIG. 10 shows a throttle valve (accelerator) opening/intake air flow calculating map for use in power control carried out by the device as illustrated in FIG. 1.

Referring to FIG. 6, description will be made as ragards do an engine power control process. At the beginning of this sub-routine, the DBWECU 3 carries out an initialization operation at step Sa1. At step Sa2, current conditions of the engine E and the power transmission method P are detected by using the data signal indicative of, for example, the accelerator opening $\theta a$ and the engine speed Ne. The detected data are then stored in a predetermined area. At step Sa3, a required engine torque Teo is calculated by using an intake air flow/torque calculating map as illustrated in FIG. 9 and a throttle valve (accelerator) opening/intake air flow calculating map as illustrated in FIG. 10. In FIG. 9, the abscissa represents the intake air flow A/N and the ordinate represents an engine torque T while the absuccissa and the ordinate in FIG. 10 represent the throttle valve opening and the intake air flow, respectively. At step Sa4, an engine power torque corrected amount Te is calculated.

Figure 14:
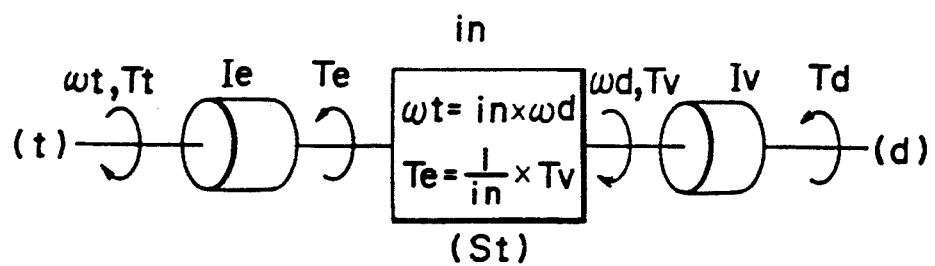
FIG. 14 is a schematic view of a dynamic model which represents dynamical function of the CVT in the device as illustrated in FIG. 1.

Now, FIG. 14 is temporary turned to for the purpose of fully understanding the calculation operation carried out at the step Sa4. In FIG. 14, illustrated is a dynamic model of the continuous variable transmission 35. The primary pulley 26 having a moment of inertia Ie is supplied with an input with a torque Tt and an angular velocity of wt from a torque converter (t). The torque Tt is transmitted to a steel belt (st) as a torque Te. On the other hand, the secondary pulley 28 having a moment of inertia Iv is supplied of an input with a torque Tv and an angular velocity of Wd from the steel belt (st). The torque Tv is transmitted to a driving output (d) as a torque Td. In this way, the torque Te is transmitted through the steel belt (st) to the driving output as the torque Td when the gear changing is carried out between both pulleys at the gear ratio in. The primary and secondary pulleys are operated by the following equations:

$$Ie \times (d\,wt/dt) = Tt - Te \quad (3)$$

$$Iv \times (d\,Wt/dt) = Tv - Td \quad (4)$$

Thus, the following equations are obtained:

$$\begin{aligned} d\,wt/dt &= d(in \times wd)/dt \\ &= (di/dt) \times wd + in \times (dwd/dt) \end{aligned} \quad (5)$$

$$Te = (1/in) \times Tv \quad (6)$$

The results of the equations (5) and (6) are substituted into the above equation (3), namely:

$$Ie \times (di/dt) \times wd + in \times Ie \times (d\,wd/dt) = Tt - (1/in) \times Tv \quad (7)$$

The equation (7) is multiplied by in and the result thereof is added to the equation (4). Further, the resultant equation is rearranged in consideration of $wt = in \times Wd$, namely:

$$d\,wd/dt = (in \times Tt - Td)/(Iv + in^2 \times Ie) - \\ (Ie \times (di/dt) \times wt)/(Iv + in^2 \times Ie) \quad (8)$$

where the first term of the equation (8) represents an acceleration component depending on the engine power produced on the driving shaft while the second term thereof represents another acceleration component consumed on gear change of the CVT 35. In this event, an acceleration deviation $\Delta wv$ (=d wda/dt−d wdb/dt) between these accelerations can be obtained in accordance with the following equation where the second term of the equation (8) is not considered assuming that the gear speed (di/dt) is not changed:

$$\Delta wv = (in \times Tta - Td)/(Ie \times in^2 + Iv) - \quad (9)$$
$$(in \times Ttb - Td)/(Ie \times in^2 + Iv)$$
$$= (in \times (Tta - Ttb)/(Ie \times in^2 + Iv)$$

Further, (Tta−Ttb) is substituted by the engine power torque corrected amount $\Delta Te$ corresponding to the acceleration deviation to obtain the following equation:

$$\Delta wv = in \times \Delta Te/(Ie \times in^2 + Iv) \quad (10)$$

$$\Delta Te = (1/in) \times (Ie \times in^2 + Iv) \times \Delta wv \quad (11)$$

In this way, the engine power torque corrected amount $\Delta Te$ is calculated, at the step Sa4, by using the acceleration deviation $\Delta wv$ and the real gear ratio in. The engine power torque corrected amount $\Delta Te$ is required for accelerating a vehicle. In other words, it is necessary to eliminate the acceleration deviation $\Delta wv$.

Turning back to FIG. 14, a desired engine torque Teo1 is calculated by adding the engine power torque corrected amount Te obtained by the equation (11) to the desired engine torque Teo at step Sa5. The step Sa5 is followed by step Sa6. The step Sa6 calculates a maximum spare torque Tm for the current engine speed Ne by using the torque calculating map as illustrated in FIG. 11. In addition, the step Sa6 calculates a real engine torque Tn corresponding to the detected engine speed Ne and the intake air flow A/N by using the intake air flow/torque calculating map as illustrated in FIG. 9. Step Sa7 is subsequently carried out to subtract the real engine torque Tn from the maximum spare torque Tm, namely (Tm−Tn), and the result thereof is compared with the engine power torque corrected amount $\Delta Te$.

When the step Sa7 is positive, step Sa8 follows. At the step Sa8, a corrected desired engine torque Te is determined by adding the engine power torque corrected value $\Delta Te$ to the desired engine torque Teo1. This step is succeeded by step Sa10. On the other hand, step Sa9 is carried out when the step Sa7 is affirmative. The step Sa9 determines the desired engine torque Te to be corrected so as to make the desired engine torque Te equal to a maximum torque Temax, that is, the maximum spare torque Tm corresponding to the current engine speed Ne. In addition, the deficient torque $\Delta Tm$ is calculated by subtracting (Tm−Tn) from the engine power torque corrected amount $\Delta Te$, namely:

$$\Delta Tm = Te - (Tm - Tn) \quad (12)$$

The value of the deficient torque $\Delta Tm$ is stored in a predetermined area. The step Sa9 is followed by the step Sa10. It is noted that the steps Sa7 to Sa9 are carried out for substituting the desired engine torque Te into the maximum spare torque Tm when the sum of the real engine torque Tn and the engine power torque corrected amount $\Delta Te$ is larger than the maximum spare torque Tm.

At the step Sa10, the throttle opening $\theta s$ is determined in accordance with the desired engine torque Te and the engine speed Ne by using the maps as illustrated in FIGS. 9 and 10. The subsequent step Sa11 calculates an opening deviation $\Delta \theta$ by subtracting a real opening detected by the throttle opening sensor 12 from the calculated throttle opening $\theta s$, namely:

$$\Delta \theta = \theta s - \theta n \quad (13)$$

Furthermore, the step Sa11 calculates a power Phn with which the opening deviation $\Delta \theta$ can be eliminated. This step is followed by step Sa12 to operate the throttle valve 9 by means of supplying the power Phn to the pulse motor 11. In this way, the corrected desired engine torque Te is generated for the internal combustion engine.

Referring now to FIG. 7, description will be made as regards to the operation carried out by the CVTECU 21. At step Sb1, the CVTECU 21 carries out initialization to determine whether or not each circuit is properly operated. At step Sb2, the CVTECU 21 reads data supplied from each sensor and stores the data in a predetermined memory area. The data represents, for example, the rotation speed wcf and wcr of the primary pulley 26 and the secondary pulley 28, respectively, and the accelerator opening $\theta a$ supplied from the accelerator opening sensor 13 through the DBWECU 3.

At step Sb3, the real gear ratio in is obtained by dividing the rotation speed wcf by the rotation speed wcr, that is:

$$in = wcf/wcr \quad (14)$$

In addition, the following step Sb4 calculates the car speed Vn by multiplying the rotation speed wcr of the secondary pulley 28 by the constant $\alpha$, that is:

$$Vn = wcr \times \alpha \quad (15)$$

The car acceleration dVn/dt is calculated at step Sb5 according to the real car speed Vn and a previous car speed V(n−1). Subsequent step Sb6 calculates a smoothed acceleration dVf/dt on the basis of the real car acceleration dVn/dt and previous car accelerations dV(n−1)/dt, dV(n−2)/dt ..., namely:

$$dVf/dt = \beta \times dV(n-1)/dt + (1-\beta) \times dVn/dt \quad (16)$$

Figure 8:
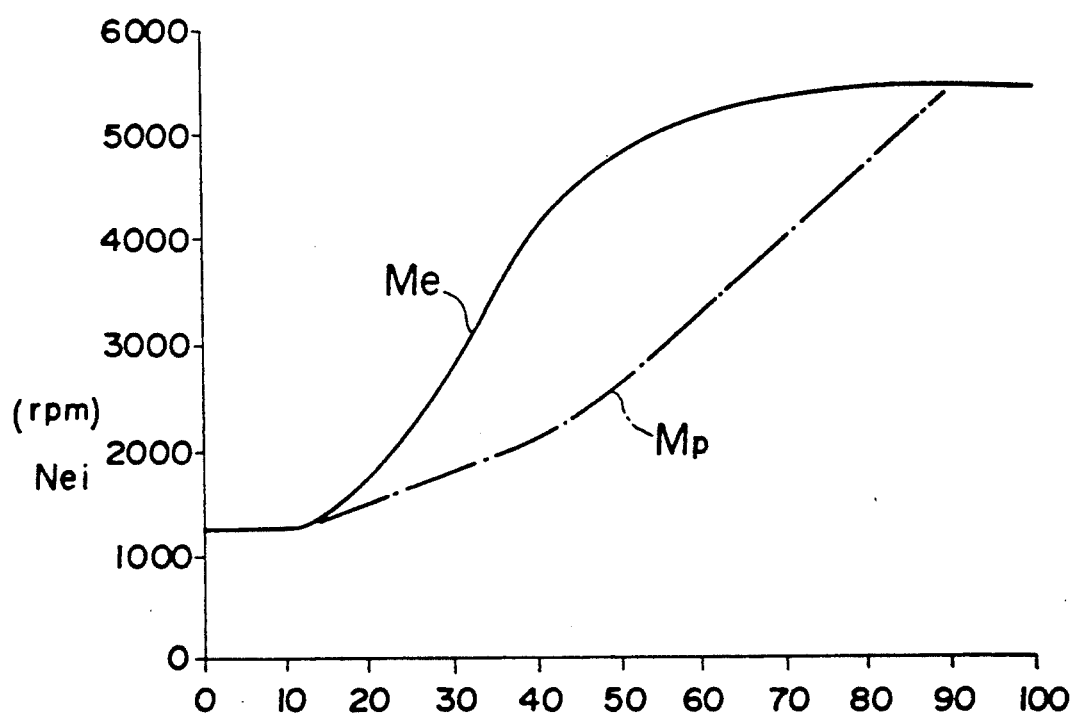
FIG. 8 shows a gear-ratio-corresponding engine speed calculating map for use in power control carried out by the device as illustrated in FIG. 1.

By the calculated smoothed acceleration dVf/dt, the desired acceleration dVo/dt is renewed. At step Sb7, the real car acceleration dVn/dt is compared with the desired acceleration dVf/dt to calculate the acceleration deviation $\Delta wv$ according to the following equation:

$$\Delta wv = (dVf/dt - dVn/dt)/2\pi r \quad (17)$$

where r represents a radius of the wheel. The obtained $\Delta wv$ is corrected into the deviation of the rotation acceleration and stored in a predetermined area. At step Sb8, a desired gear-ratio-corresponding engine speed Nei is calculated by using the desired gear-ratio-corresponding engine speed calculating map as illustrated in FIG. 8. Following step Sb9 is carried out for calculating the gear ratio deviation $\Delta i$ between the desired gear ratio io and the real gear ratio in. Step Sb10 calculates the gear speed Vm for the gear ratio deviation Δi by using the gear speed calculating map as illustrated in FIG. 12. In this event, the maximum value Vmax and the minimum value Vmin of the gear speed Vm are predetermined by the map. The calculated gear speed Vm is used as a temporary gear speed.

At step Sb11, the gear speed deficiency Vmt corresponding to the real gear ratio in is calculated by using the following equation:

$$d\,wd/dt = (in \times Tt - Td)/(Ie \times in^2 + Iv) - \\ ((di/dt) \times Ie \times we)/(Ie \times in^2 + Iv) \quad (18)$$

The equation (18) is derived from the equation (8) by substituting wt into we (which corresponds to the engine speed). The second term of the equation (18) is an acceleration component to be consumed for gear changing of the CVT 35. In other words, the hydraulic pressure p for the primary pulley 26 corresponds to the gear speed (di/dt) as will later be described in more detail. It is assumed that the torque consumed for gear changing at the gear speed (di/dt) is equivalent to the gear torque corrected amount ΔTei, which is also referred as the deficient torque ΔTm at step Sb12 described below. In this event, the following equation can be obtained:

$$(in \times \Delta Tei)/(Iw \times in^2 + Iv) - \\ ((di/dt) \times Ie \times we)/(Ie \times in^2 + Iv) = 0 \quad (19)$$

according to the equation (19), the following equations can be obtained:

$$in \times \Delta Tei = (di/dt) \times Ie \times we \quad (20)$$

$$di/dt = Vmt = in \times (1/(Ie \times we)) \times \Delta Tei \quad (21)$$

By using these equations, the gear speed Vm1 is decided by the following equation:

$$Vm1 = Vm - Vmt \quad (22)$$

At the step Sb12, the primary pressure Pp and the line pressure Pr is determined for the decided gear speed Vm1 (di/dt) by using the predetermined primary pressure calculating map. It is noted that the control device according to the present embodiment of this invention is designed so as to apply a constant line pressure Pr for the secondary pulley 28. As well known in the art, the gear speed (di/dt) is controlled by changing the hydraulic pressure P applied to the pulleys 26 and 28 in the continuous variable transmission 35. Accordingly, the following equation is obtained.

$$di/dt = f(p),\ imin \leq i \leq imax \quad (23)$$

Figure 15:
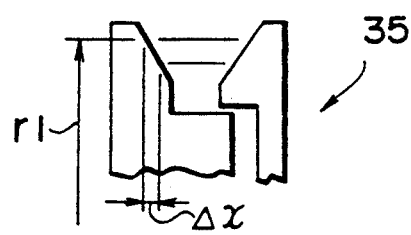
FIG. 15 is a schematic diagram showing a part of a pulley in the device as illustrated in FIG. 2.

Referring temporarily to FIGS. 15 and 16 in addition to FIG. 7 for further understanding of the operation carried out at the step Sb12. FIG. 15 shows a schematic diagram of a part of the pulley in the continuous variable transmission 35. In FIG. 15, r1 represents an effective diameter of the pulley and Δ represents a shift amount of the pulley. The shift amount Δχ is calculated by the following equation:

$$\Delta x = (1/S) \times \int Q dt \quad (24)$$

where Q represent a fuel injection amount and (1/S) represents a proportional constant. In this event, the effective diameter r1 is considered as being directly proportional to the shifting amount Δχ. Additionally, the gear speed Vm1 corresponding to the change of the gear ratio i is considered as being directly proportional to the change of the effective diameter r1 of the pulley (dr1/dt). Accordingly, the following equation can be derived:

$$d(\Delta x)/dt = (1/S) \times Q \\ = (1/S) \times \sqrt{k \times \Delta p} \quad (25)$$

By using this equation (25), the gear speed calculating map as illustrated in FIG. 16 can be obtained. As shown in FIG. 16, the primary pressure $P_p$ is determined in accordance with the gear speed Vm1 (di/dt) where p (primary pressure $P_p$) is equal to pressure difference in two hydraulic chambers (which is proportion to the fuel flow). At step Sb13, duty ratios Dup and Dur are determined so as to keep the primary and line pressures Pp and Pr. The first and the second electromagnetic valves 33 and 34 are controlled with respect to the determined duty ratios Dup and Dur, respectively, and thereby the real gear ratio in of the continuous variable transmission 35 approaches the desired gear ratio io.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a control device for an internal combustion engine and a continuous variable transmission, said internal combustion engine is mounted on a vehicle and said continuous variable transmission is disposed between said internal combustion engine and driving wheels and a transmission ratio of said continuous variable transmission is continuously changeable, said control device comprising:
   engine output adjusting means for adjusting an output of said internal combustion engine without depending upon operational amount of a driver-operable member;
   operational amount detecting means for detecting operational amount of said driver-operable member to produce an operational amount signal;
   target transmission ratio determining means for determining a target transmission ratio for said continuous variable transmission in response to said operational amount signal to produce a target transmission ratio signal;
   transmission ratio detecting means for detecting an actual transmission ratio of said continuous variable transmission to produce an actual transmission ratio signal;
   transmission ratio deviation calculating means for calculating a deviation between said target transmission ratio determined by said target transmission ratio determining means and said actual transmission ratio detected by said transmission ratio detecting means to produce a transmission ratio deviation signal;
   changing speed determining means for determining a changing speed of the transmission ratio in response to said transmission ratio deviation signal to produce a changing speed signal;

driving condition detecting means for detecting a driving condition of the vehicle to produce a driving condition signal, wherein said driving condition includes at least an actual acceleration of said vehicle which is a time-dependent variation of the running speed of said vehicle;

target acceleration determining means for determining a target vehicle acceleration in response to said driving condition signal to produce a target acceleration speed signal;

acceleration deviation calculating means for calculating an acceleration deviation between said target vehicle acceleration determined by said target acceleration determining means and said actual vehicle acceleration detected by said driving condition detecting means to produce an acceleration deviation signal;

engine torque correction amount determining means for producing in response to said acceleration deviation signal an engine torque correction amount signal, wherein said engine torque correction amount signal is required for eliminating said acceleration deviation calculated by said acceleration deviation calculating means;

engine torque controlling means for controlling said engine output adjusting means on the basis of said engine torque correction amount signal when an engine torque can be changed by said engine torque correction amount, and on the basis of a restricted engine torque correction amount when the engine torque cannot be changed by said engine torque correction amount, wherein said restricted engine torque correction amount is obtained by restricting said engine torque correction amount within a range where the engine torque can be changed;

transmission ratio changing speed correcting means for correcting said changing speed of the transmission ratio determined by said changing speed determining means, when said engine torque correction amount is restricted, on the basis of a deficient torque to produce a corrected changing speed signal, wherein said deficient torque is lacked by restricting said engine torque correction amount; and transmission controlling means for controlling said continuous variable transmission in response to said corrected changing speed signal so that an actual transmission ratio converges to said target transmission ratio determined by said target transmission ratio determining means with the changing speed of the transmission ratio corrected by said changing speed correcting means.

2. A control device as claimed in claim 1, wherein said device further required torque determining means for determining a required torque signal representing a torque of said internal combustion engine required by a driver of said vehicle in response to said operational amount signal detected by said operational amount detecting means.

3. A control device as claimed in claim 2, wherein said engine torque controlling means comprises:

target engine torque determining means for determining a target torque for said internal combustion engine in response to said required torque signal supplied from said required torque determining means and to said engine torque correction amount signal supplied from said engine torque correction amount determining means to produce a target torque signal;

restricting means for restricting said target engine torque signal supplied from said target engine torque determining means within a range of an allowable engine torque; and engine output controlling means for controlling said engine output adjusting means in response to said target engine torque signal being restricted within said range of the allowable engine torque.

4. A control device as claimed in claim 3, wherein said target torque determining means is for use in determining said target torque in response to said operational amount signal supplied from said operational amount detecting means and to said driving condition signal representative of said driving condition of said internal combustion engine and said restricting means uses a maximum torque of said internal combustion engine as a maximum value of said range of the allowable engine torque, and uses said driving condition as a parameter to determine said maximum torque of said internal combustion engine.

5. A control device as claimed in claim 4, wherein said changing speed correcting means corrects said transmission changing speed of the transmission ratio in accordance with a deviation between said desired engine torque determined by said target engine torque determining means and said maxumun torque of said internal combustion engine, which is for use in restricting said target engine torque in said restricting means.

6. A control device as claimed in claim 1, wherein said driving condition detecting means detects a smoothed acceleration which is obtained by smoothing previous car accelerations of said vehicle in response to said real acceleration speed signal of said vehicle.

7. A control device as claimed in claim 6, wherein said target acceleration determining means determines a target acceleration in accordance with said smoothed acceleration detected by said driving condition detecting means.

8. A control device as claimed in claim 1, wherein said driver-operable member is an accelerator pedal.

9. A control device as claimed in claim 1, wherein said engine output adjusting means is a throttle valve.

* * * * *

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Cover page, item [54]

Line 3, change "CONTINUOUS" to --CONTINUOUSLY--

Cover page, item [57]

Line 2, change "continuous" to --continuously--; delete "well-"
    Line 3, change "responsible" to --responsive--
    Line 5, change "power" to --output--
    Line 6, delete "power"; change "corrected" to --correction--
    Line 8, change "a corrected" to --the--; delete "power"; change "corrected" (second occurrence) to --correction--
    Line 9, delete "corrected"
    Line 10, delete "power"; change "corrected" to --correction--
    Line 11, delete "amount corrected"; delete "power"; change "corrected" to --correction amount--
    Line 12, change "power" to --output--

<u>IN THE DRAWINGS</u>

<u>Fig. 1</u>, replace with attached Fig. 1 to correct the term "continuous" in element 21 to --continuously--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

IN THE DRAWINGS

Fig. 5, replace with attached Fig. 5 to add a question mark to the phrase "fuel cut" in step S2 to properly indicate that this is a decision step, and to correct "power" in step S13 to --output--

Fig. 6, replace with attached Fig. 6 to change "power" in the step preceding step Sa1 to --output--

Column 1

In the title, change "CONTINUOUS" to --CONTINUOUSLY--

Line 15, change "continuous" to --continuously--
Line 17, change "continuous" to --continuously--
Line 18, change "method" to --system--
Line 21, change "power" to --output--
Line 24, change "continuous" to --continuously--
Line 27, change "power" to --output--; delete "(hereinafter referred as"
Line 28, delete "power)"
Line 34, change "However, when" to --When--
Line 36, change "power" to --output--
Line 37, change "power" to --output--
Line 38, after "steps" insert --on--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 1

Line 42, change "method" to --methods--
    Line 56, change "continuous" to --continuously--
    Line 65, change "An information" to --Information--;
        change "power" to --output--

Column 2

Line 1, change "power" to --output--
    Line 3, change "continuous" to --continuously--
    Line 5, change "power" to --output--
    Line 7, change "a real" to --an actual--
    Line 8, change "a bad re-" to --poor performance--
    Line 9, delete "sponsibility"
    Line 11, change "real" (1st occurrence) to —actual—
    Line 13, change "real" to --actual--
    Line 17, change "power" to --output--
    Line 18, change "real" to --actual--
    Line 20, change "a power" to --an output--
    Line 21, change "power" to --output--
    Line 23, change "continuous" to --continuously--
    Line 24, change "as" to --with--
    Line 27, change "continuous" to --continuously--
    Line 29, change "desired" to --target--
    Line 30, change "a real" to --an actual--
    Line 31, change "Of" to --of--
    Line 33, change "variable speed" to --gear ratio changing
        speed--

UNITED STATES PATENT AND TRADEMARK OFFICE
CERTIFICATE OF CORRECTION

PATENT NO. : 5,305,662

DATED : April 26, 1994

INVENTOR(S) : Kazuhide Togai, Takashi Takatsuka, Makoto Shimada
Junji Kawai, Kazuya Hayafune It is certified that error appears in the above-indentified patent and that said Letters Patent is hereby corrected as shown below:

Column 2

```
Line 34, change "continuous" to --continuously--
Line 36, change "real" to --actual--
Line 37, change "desired" to --target--
Line 38, delete "on control"; change "in" to --is--
Line 42, change "desired" to --target--
Line 43, change "real" to --actual--
Line 49, change "slide" to --sliding--
Line 52, change "continuous" to --continuously--
Line 66, change "continuous" to --continuously--
```

Column 3

```
Line 2,  change "continuous" to --continuously--
Line 12, change "continuous" to --continuously--
Line 15, change "continuous" to --continuously--
Line 64, change "continuous" to --continuously--
Line 65, change "continuous" to --continuously--
```

Column 4

```
Line 31, change "continuous" to --continuously--
Line 42, change "sub routine" to --sub-routine--
Line 43, change "power" to --output--
Line 48, change "gear-ratio-corresponding engine" to
         --gear ratio changing--
```

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 4

Line 52, change "power" to --output--
    Line 55, change "power" to --output--
    Line 58, change "power" to --output--
    Line 60, after "gear" insert --ratio changing--
    Line 61, change "power" to --output--
    Line 64, change "power" to --output--

Column 5

Line 3, after "gear" insert --ratio changing--
    Line 10, change "method" to --system--
    Lines 12-13, change "continuous" to --continuously--
    Line 17, change "an injector" to --injectors--; change "a spark plug" to --spark plugs--
    Line 19, change "injector 1 is" to --injectors 1 are--
    Line 20, change "a device" to --devices--
    Line 22, change "plug 2 is a device" to --plugs 2 are devices--
    Line 25, change "continuous" to --continuously--
    Line 28, change "continuous" to --continuously--
    Line 30, change "method" to --system--
    Line 34, change "Each of the microcomputers" to --The microcomputer--
    Line 36, change "power" to --output--
    Line 38, change "gear-ratio-corresponding engine" to --gear ratio changing--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 5

Line 43, before "speed" insert --ratio changing--
    Line 45, before "speed" insert --ratio changing--
    Line 53, change "namely" to --the--
    Line 59, change "0a" to --$\theta$a--
    Line 60, change "0a" to --$\theta$a--

Column 6

Line 10, delete "passing"
    Line 13, change "can be" to --are--
    Line 15, delete "for sensing physical amounts of the intake air"
    Line 19, change "sensing devices" to --sensors--
    Line 32, change "can be" to --is--
    Line 49, change "plug" to --plugs--
    Line 57, change "clarification" to --purifying--
    Line 58, change "clarification" to --purifying--
    Line 61, change "clarified" to --purified--; change "exhausted" to --discharged--
    Line 67, change "continuous" to --continuously--

Column 7

Line 2, change "continuous" to --continuously--
    Line 5, change "united" to --integral--

UNITED STATES PATENT AND TRADEMARK OFFICE
CERTIFICATE OF CORRECTION

PATENT NO. : 5,305,662

DATED : April 26, 1994

INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 7

Line 6, change "united" to --integral--
    Line 10, delete "using"
    Line 39, change "the" to --a--
    Lines 40-41, change "Under such circumstances" to
        --In this state
    Line 43, before "the" insert --the gear ratio of--;
        change "continuous" to --continuously--
    Line 44, change "achieved by means" to --changed by--
    Line 52, change "a" to --an--
    Line 53, change "real" to --actual--
    Line 61, change "continuous" to --continuously--

Column 8

Line 7, change "desired" to --target--
    Line 8, after "gear" insert --ratio changing--
    Line 10, change "desired" to --target--
    Line 12, delete "power"; change "corrected" to
        --correction--
    Line 13, after "gear" insert --ratio changing--
    Line 16, change "sensor" to --sensors--; delete "a"
    Line 17, change "speed" to --speeds wcf and wcr--; delete
        ", namely, wcf and"

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 8

Line 18, delete "wcr, respectively"
Line 19, after "is" insert --actually--; delete ", in reality,"; delete "repre-"
Line 20, change "senting" to --representative--
Line 28, change "detecting arrangement" to --sensor--; change "a real" to --an actual--
Line 29, change "continuous" to --continuously--
Line 30, change "real" to --actual--
Line 31, change "arrangement" to --unit--
Line 35, change "desired" to --target--
Line 38, change "desired" to --target--
Line 40, change "desired" to --target--
Line 41, change "desired" to --target--
Line 42, change "continuous" to --continuously--; change "desired" to --target--
Line 46, change "real" to --actual--; change "desired" to --target--
Line 50, after "gear" (2nd occurrence) insert --ratio changing--
Line 51, after "gear" insert --ratio changing--
Line 52, after "gear" (1st occurrence) insert --ratio changing--
Line 54, after "gear" insert --ratio changing--
Line 65, change "desired" to --target--
Line 67, change "dvf" to --dVf--; change "desired" to --target--
Line 68, change "dvo" to --dVo--; delete "de-"

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

<u>Column 9</u>

Line 1, change "sired" to --target--
Line 4, change "desired" to --target--; change "dvo" to --dVo--
Line 7, change "real" to --actual--; delete "power"; change "corrected" to --correction--
Line 9, delete "power"; change "corrected" to --correction--
Line 10, delete "power"; change "corrected" to --correction--
Line 12, delete "power"
Line 14, change "desired" to --target--
Line 17, change "acceleration" to --accelerator--
Line 19, change "desired" to --target--
Line 20, change "desired" to --target--
Line 21, delete "power"
Line 22, change "corrected" to --correction--
Line 25, change "desired" to --target--
Line 28, change "desired" to --target--
Line 29, change "desired" to --target--
Line 33, after "gear" insert --ratio changing--
Line 39, change "desired" to --target--
Line 41, after "gear" insert --ratio changing--
Line 42, after "gear" insert --ratio changing--
Line 43, after "gear" insert --ratio changing--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 9

Line 44, change "gear speed" to --gear ratio changing speed--
    Line 45, change "gear speed" to --gear ratio changing speed--
    Line 46, after "gear" (both occurrences) insert --ratio changing--
    Line 47, after "gear" insert --ratio changing--
    Line 49, change "real" to --actual--; after "gear" (second occurrence) insert --ratio changing--
    Line 50, after "gear" insert --ratio changing--
    Line 51, after "gear" (both occurrences) insert --ratio changing--
    Line 52, change "controlling unit" to --transmission controlling arrangement--
    Line 53, after "gear" insert --ratio changing--
    Line 58, change "torque/real" to --torque/actual--
    Line 60, change "desired" to --target--
    Line 62, change "torque/real" to --torque/actual--
    Line 66, change "torque/real" to --torque/actual--
    Line 67, change "a" to --an--
    Line 68, change "real" to --actual--

Column 10

Line 5, change "real" to --actual--
    Line 9, delete "power"
    Line 10, change "corrected" to --correction--

UNITED STATES PATENT AND TRADEMARK OFFICE
CERTIFICATE OF CORRECTION

PATENT NO. : 5,305,662            Page 11 of 17
DATED : April 26, 1994
INVENTOR(S): Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 10

```
    Line 11, delete "power"
    Line 12, change "corrected" to --correction--
    Line 13, delete "power"; change "corrected" to
          --correction--
    Line 16, delete "power"; change "corrected" to
          --correction--
    Line 17, change "desired" to --target--
    Line 19, change "corrected desired" to --correction
          target--
    Line 20, delete "output"; change "corrected" to
          --correction--
    Line 21, change "desired" to --target--; delete "power"
    Line 22, change "corrected" to --correction--
    Line 24, delete "power"; change "corrected" to
          --correction--
    Line 25, delete "power"
    Line 26, change "corrected" to --correction--; change
          "desired" to --target--
    Line 31, change "desired" to --target--
    Line 32, change "desired" to --target--
    Line 34, change "desired" to --target--
    Line 38, delete "power"; change "corrected" to
          --correction--
    Line 42, change "are" to --carry out their--
    Line 43, delete "carried out in"
    Line 49, change "method" to --system--
    Line 61, delete "equal in number to"
```

UNITED STATES PATENT AND TRADEMARK OFFICE
CERTIFICATE OF CORRECTION

PATENT NO. : 5,305,662           Page 12 of 17
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 10

```
        Line 62, delete "equal in number to"
Column 11, line 3, change "determine" to --determines--
        Line 15, delete "a sensed"
        Line 25, change "corrected" to --correction--
        Line 28, change "corrected" to --correction--
        Line 29, change "corrected" to --correction--
        Line 30, change "corrected" to --correction--
        Line 41, delete "cor-"
        Line 42, change "rected" to --correction--
        Line 44, change "corrected" to --correction--
        Line 46, change "corrected" to --correction--
        Line 57, change "power" to --output--
        Line 58, change "power" to --output--
        Line 61, change "injector" to --injectors--
        Line 63, change "a" to --the--
        Line 67, change "plug" to --plugs--
```

Column 12

```
        Line 4, change "power" to --output--
        Line 8, change "method" to --system--
        Line 21, delete "power"; change "corrected" to
            --correction--
        Line 26, change "continuous" to --continuously--
        Line 27, change "a" to --the--
        Line 28, delete "with an input"
```

UNITED STATES PATENT AND TRADEMARK OFFICE
CERTIFICATE OF CORRECTION

PATENT NO. : 5,305,662  
DATED : April 26, 1994  
INVENTOR(S) : Kazuhide TOGAI, Takashi TAKATSUKA, Makoto SHIMADA  
Junji KAWAI, Kazuya HAYAFUNE It is certified that error appears in the above-indentified patent and that said Letters Patent is hereby corrected as shown below:

Column 12

> Line 32, delete "of an input"  
> Line 37, change "changing is carried out" to --gear ratio in is being changed--  
> Line 38, delete "at the gear ratio in"

Column 13

> Line 3, change "power" to --output--; change "on" to --by--  
> Line 5, change "on gear change" to --by the changing gear ratio--  
> Line 10, after "gear" insert --ratio changing--  
> Line 17, delete "power"; change "corrected" to --correction--  
> Line 25, delete "power"; change "corrected" to --correction--  
> Line 27, change "real" to --actual--  
> Line 28, delete "power"; change "corrected" to --correction--  
> Line 31, change "desired" to --target--  
> Line 32, delete "power"  
> Line 33, change "corrected" to --correction--  
> Line 34, change "desired" to --target--  
> Line 38, change "a real" to --an actual--  
> Line 43, change "real" to --actual--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 13

```
Line 45, delete "power"; change "corrected" to
        --correction--
Line 48, change "desired" to --target--
Line 49, delete "power"; delete "cor-"
Line 50, change "rected" to --correction--; change
        "desired" to --target--
Line 53, change "desired" to --target--
Line 54, change "desired" to --target--
Line 59, delete "power"; change "corrected" to
        --correction--
Line 66, change "desired" to --target--
Line 68, change "real" to --actual--; delete "power"
```

Column 14

```
Line 1, change "corrected" to --correction--
Line 4, change "desired" to --target--
Line 7, change "a real" to --an actual--
Line 16, change "power" to --output--
Line 17, change "desired" to --target--
Line 27, change "speed" to --speeds--
Line 31, change "real" to --actual--
Line 43, change "real" to --actual--
Line 45, change "real" to --actual--
Line 52, change "desired" to --target--
```

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

Column 14

Line 53, change "real" to --actual--
    Line 54, change "desired" to --target--
    Line 63, delete "desired gear-ratio-corresponding engine speed"
    Line 64, change "Nei" to --target gear ratio changing speed--; delete "desired gear-ratio-corre-"
    Line 65, change "sponding engine speed" to --engine speed Nei and gear ratio changing speed--
    Line 67, change "desired" to --target--
    Line 68, change "real" to --actual--

Column 15

Line 1, change "gear" to --changing--
    Line 2, change "gear speed" to --gear ratio changing speed--
    Line 4, change "gear speed" to --gear ratio changing speed--
    Line 5, change "gear speed" to --gear ratio changing speed--
    Line 6, change "gear speed" to --gear ratio changing speed--
    Line 7, change "gear speed" to --gear ratio changing speed--
    Line 8, change "real" to --actual--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA Junji KAWAI, Kazuya HAYAFUNE It is certified that error appears in the above-indentified patent and that said Letters Patent is hereby corrected as shown below:

Column 15

Line 17, change "gear chang-" to --the changing of the gear ratio--
   Line 18, delete "ing"
   Line 20, before "speed" insert --ratio changing--
   Line 21, after "gear" insert --ratio--
   Line 22, after "gear" insert --ratio changing--; delete "equivalent to the gear torque"
   Line 23, delete "corrected amount"
   Line 37, change "gear speed" to --gear ratio changing speed--
   Line 43, after "gear" insert --ratio changing--
   Line 50, change "continuous" to --continuously--
   Line 58, change "continuous" to --continuously--
   Line 60, change "shift" to --moving distance--
   Line 61, delete "amount" (first occurrence); change "shift amount" to --moving distance--

Column 16

Line 2, after "gear" insert --ratio-changing--
   Line 12, after "gear" insert --ratio-changing--
   Line 15, after "gear" insert --ratio-changing--
   Line 23, change "real" to --actual--

UNITED STATES PATENT AND TRADEMARK OFFICE
CERTIFICATE OF CORRECTION

PATENT NO. : 5,305,662
DATED : April 26, 1994
INVENTOR(S) : Kazuhide TOGAI, Takashi TAKATSUKA, Makoto SHIMADA
Junji KAWAI, Kazuya HAYAFUNE It is certified that error appears in the above-indentified patent and that said Letters Patent is hereby corrected as shown below:

IN THE CLAIMS

Column 16

```
Line 35, change "continuous" to --continuously--
Line 37, change "continuous" to --continuously--
Line 39, change "continuous" to --continuously--
Lines 50-51, change "continuous" to --continuously--
Line 55, change "continuous" to --continuously--
```

Column 17

```
Line 46, change "continuous" to --continuously--
```

Signed and Sealed this

Twenty-first Day of May, 1996

*Attest:*

BRUCE LEHMAN

*Attesting Officer*     Commissioner of Patents and Trademarks